United States Patent [19]
Yuuki et al.

[11] Patent Number: 5,951,683
[45] Date of Patent: Sep. 14, 1999

[54] MULTIPROCESSOR SYSTEM AND ITS CONTROL METHOD

[75] Inventors: Kazuhiro Yuuki; Yukihiro Katsumata; Takeo Tabata, all of Kawasaki; Shinichiro Nakamura, Unoke-machi, all of Japan

[73] Assignees: Fujitsu Limited, Kawasaki; PFU Limited, Kahoku, both of Japan

[21] Appl. No.: 08/995,000

[22] Filed: Dec. 19, 1997

Related U.S. Application Data

[63] Continuation of application No. 08/374,296, Jan. 18, 1995, abandoned.

[30] Foreign Application Priority Data

Jan. 28, 1994 [JP] Japan .................................. 6-008482

[51] Int. Cl.⁶ .......................... G06F 9/445; G06F 15/00
[52] U.S. Cl. .......................... 713/1; 709/208; 709/209; 712/31; 714/13
[58] Field of Search ..................... 395/800, 379, 395/651, 182.11, 700, 675; 711/113; 714/23, 13; 713/1; 709/208, 209; 712/31

[56] References Cited

U.S. PATENT DOCUMENTS

| | | | |
|---|---|---|---|
| 4,634,110 | 1/1987 | Jurlich | 364/131 |
| 4,648,035 | 3/1987 | Fava et al. | 364/200 |
| 4,674,033 | 6/1987 | Miller | 394/200 |
| 4,954,945 | 9/1990 | Inoue | 395/675 |
| 5,257,372 | 10/1993 | Furtney | 711/113 |
| 5,418,955 | 5/1995 | Ikeda | 364/DIG. 2 |
| 5,465,360 | 11/1995 | Miller et al. | 395/700 |
| 5,491,788 | 2/1996 | Cepulis | 714/23 |
| 5,568,617 | 10/1996 | Kametani | 395/280 |
| 5,583,987 | 12/1996 | Kobayash et al. | 395/182.11 |

FOREIGN PATENT DOCUMENTS

| | | |
|---|---|---|
| 0447577 | 9/1991 | European Pat. Off. . |
| 4-025962 | 1/1992 | Japan . |
| 4-181438 | 6/1992 | Japan . |
| 1456941 | 12/1976 | United Kingdom . |

*Primary Examiner*—Joseph E. Palys
*Assistant Examiner*—Rijue Mai
*Attorney, Agent, or Firm*—Staas & Halsey, LLP

[57] ABSTRACT

One of processors connected effectively to a system is allocated to a master processor and the other remaining processors are allocated to slave processors. Each processor compares the self processor number of a processor number register and the processor number of the other processor of a processor effective register. For example, when the self processor number is smallest as compared with the other processor numbers, it is recognized that the self processor is a master processor. A master initialization diagnosing process after completion of the allocation is monitored by the slave processor. When an abnormality of the master processor is recognized, a degeneration to disconnect the master processor from the system is executed and is again reconstructed by the allocating process of master/slaves. Even when an abnormality occurs in the master processor, the operation in which the system was degenerated can be executed until the minimum construction in which two or more processors normally operate.

14 Claims, 18 Drawing Sheets

MULTIPROCESSOR SYSTEM AND ITS CONTROL METHOD

This application is a continuation of U.S. Ser. No. 08/374,296, filed Jan. 18, 1995, now abandoned.

BACKGROUND OF THE INVENTION

The present invention relates to a multiprocessor system in which a plurality of processors are connected by a shared bus and a distributing process is executed and to a control method of such a multiprocessor system. More particularly, the invention relates to a multiprocessor system in which a master authority and slave authorities in a distributing process of a multiprocessor are dynamically allocated in an initializing process at the time of a system activation and to a control method of such a multiprocessor system.

In a computer system at present, a computer which provides a performance value of 100 to 150 MIPS (100 to 150 million instructions per second) per one processor is installed even in a workstation, a server, and a personal computer. As reasons why such a performance value is realized, there can be mentioned reasons such that a performance similar to that of a large general computer can be effected with low costs by a microprocessor technique. While making efforts to raise a performance per one processor in future, a technique to raise the performance of the whole system by forming a multiprocessor system is also applied to a small size model of a desktop and a disk side model.

In a multiprocessor system, a plurality of processors are connected through a shared bus, an authority as a master is allocated to one of the processors, and an authority as a slave is allocated to the other remaining processors. What is called a master processor to which the master authority was allocated executes processes to shared sections of a memory, an input/output apparatus, and the like. What is called a slave processor to which the slave authority was allocated mainly executes a distributing process of a job. The allocation of the master processor and slave processors to a plurality of processors is fixedly determined.

In such a multiprocessor system, it is necessary to have a mechanism such that when an abnormality occurs in a processor, a degeneration to disconnect the processor in which an abnormality occurs from the system is executed and the system can operate even with a minimum construction. In the conventional multiprocessor system, therefore, at the time of an initializing process of the system activation, the master processor monitors a plurality of slave processors and a slave processor in which an abnormality occurs is disconnected from the system and is degenerated, thereby enabling the system to operate even with the minimum construction of one master processor and one slave processor. However, there is a problem such that since the master processor is fixedly determined by the connecting position or the like, when the master processor is abnormal, the degeneration operation cannot be executed, so that even if a plurality of processors can effectively operate, the system hangs up.

SUMMARY OF THE INVENTION

According to the invention, there are provided control method and apparatus of a multiprocessor system wherein even when an abnormality occurs in a master processor, the operation in which the system is degenerated can be executed until a minimum construction in which two or more processors normally operate is obtained.

According to a multiprocessor system of the invention, a plurality of processors are connected through a shared bus. A common program code to run a microprogram on the plurality of processors is stored in a memory unit such as an EEPROM or the like of a shared section connected to the shared bus. Therefore, at the time of an initializing process by a power-on-start, each of the plurality of processors executes the self initializing process while fetching the same program code on the memory unit. An instruction cache mechanism to store the program code that has once been fetched from the memory unit is built in each of the processors, thereby minimizing the occupation of the shared bus in association with the fetching of the program code in the memory unit.

The dynamic allocation of the master processor and slave processors according to the invention is as follows. At the time of the system activation by the power-on-start, each of the shared sections including a plurality of processors connected through the shared bus and the memory unit in which the program code which is common to each processor has been stored is reset. After resetting, the processors which are effectively connected to the system are discriminated and a master authority is allocated to one of those processors, thereby setting it to the master processor. A predetermined slave authority is allocated to all of the remaining processors, thereby setting them to the slave processors. As for the processor authority allocation, a wake-up bit of a wake-up register provided for each of the processors is set after completion of the resetting of each processor. The processor in which the wake-up bit was set is set into the corresponding bit of the processor effective register provided in each processor as an effective processor of the system.

On the other hand, a processor connection register in which the physical connection of the processor to the shared bus is detected and the corresponding bit is set is provided for the shared section, for example, a system bus controller or the like. In each processor, the processor numbers #0 to #3 set in a processor number register are recognized and compared with the processor numbers of the other processors shown by the processor effective register and whether the self processor is a master processor or a slave processor is recognized on the basis of the comparison result. For example, in the case where the self processor number #0 is smallest as compared with the other processor numbers #1, #2, and #3, the self processor is recognized as a master processor. In this instance, the other processors having the processor numbers #1 to #3 recognize that they are the slave processors since the processor numbers are not the smallest number. On the contrary, it is also possible to set in a rule such that when the self processor number is largest as compared with the other processor numbers, the self processor is recognized as a master processor.

When the allocation of the processor authority is finished, an initializing diagnosis is executed. The initializing diagnosis is sequentially executed in accordance with the order of the master processor and the slave processors. At the time of the initializing diagnosis of the master processor, each of the slave processors monitors whether the initializing diagnosis has normally been finished or not. In the case where either one of the slave processors which monitor the master processor detects an abnormality of the master processor, the master processor is disconnected from the system and is degenerated. After a new master processor and slave processors were allocated with respect to the remaining processors as targets, processes are again executed. In the operation to monitor the master, each slave processor sets a self threshold time Ti for monitoring the master in accordance with the priority order of the master authority allocation which is determined by the processor number #i. When the master processor starts the initialization diagnosing process, each of the slave processors starts to count a master monitoring time T. In the case where the end of the initializing diagnosis is recognized when the counting time T lies within a self threshold value Ti, the master processor is judged to be normal and the processing routine advances to the initialization diagnosing process of the next slave processor. In the case where the end of the initializing diagnosis cannot be recognized even when the counting time T reaches the self threshold time Ti, it is judged that the master processor is abnormal, so that the degenerating process follows. In this case, the slave processor which recognized the abnormality of the master processor is allocated to the next master processor.

Specifically, the master is monitored by using a timer. First, the threshold time Ti is set into the timer and the value of the timer is subtracted every time a unit time elapses during the monitoring of the master. In the case where the end of the initializing diagnosis of the master is recognized before the timer value is equal to zero, it is judged that the master processor is normal and the processing routine advances to the initialization diagnosing process of the next slave processor. In the case where the end of the initializing diagnosis of the master cannot be recognized even when the timer value reaches zero, it is judged that the master processor is abnormal and the degenerating process follows. Whether the master initializing diagnosis by the slave processor has been finished or not can be recognized by referring to a flag register provided for the master processor.

When the initializing diagnosis of the master processor is finished, the initializing diagnosis of the slave processor is subsequently executed. In this case, the master processor monitors whether the initializing diagnosis of the slave processor has normally been finished or not. When the master processor detects an abnormality of the slave processor, the slave processor in which an abnormality occurs is disconnected from the system and is degenerated. Specifically, the master processor sets a predetermined threshold time T0 for monitoring the slave. When the initialization diagnosing process of the slave processor is started in association with the end of the initializing diagnosis of the master processor, the counting of the slave monitoring time T is started. Whether the initializing diagnosis by the slave processor has been finished or not is monitored during the time counting operation. When the end of the initializing diagnosis is recognized when the counting time lies within the threshold time T0, it is judged that the slave processor is normal. In the case, however, where the end of the initializing diagnosis cannot be recognized even when the counting time reaches the threshold time T0, it is judged that the slave processor is abnormal, and the degenerating process to disconnect the slave processor from the system is executed. The time monitoring is executed by subtracting the timer value T to which the threshold time T0 has been set every time the unit time elapses. When the end of the initializing diagnosis of the slave is recognized before the time value T is equal to zero, it is judged that the slave processor is normal. On the other hand, when the end of the initializing diagnosis of the slave cannot be recognized even when the timer value T reaches zero, it is judged that the slave processor is abnormal, and the slave processor is disconnected. Whether the initializing diagnosis of the slave processor has been finished or not can be recognized by the master processor by referring to a waiting state arrival register of the shared section into which a corresponding bit is set by the arrival to the waiting state based on the end of the initializing process of the slave processor.

According to such multiprocessor system and its control method of the invention, the wake-up register to show the self leading state, the processor effective register by which the states of all of the effective processors can be seen, the processor connection register to show the physical connection of the processor, the processor number display register to show the self CPU No., and the flag register to show the state of each processor are possessed, so that the master processor and the slave processors can be dynamically determined while allowing the microprograms of the processors to be executed by the same program code on the ROM at the time of the system activation. That is, the master processor and the slave processors can be dynamically determined from the processors as targets which were made operative at the time of the system activation. A hang-up when the master processor is fixedly determined at the connecting position and isn't activated can be certainly prevented. Particularly, the initialization diagnosing process which is executed by the master processor at the time of the system activation is monitored by the slave processors and when an abnormality of the master processor is recognized, processes such that a degeneration to disconnect the master processor from the system is executed and the master processor and the slave processors are again relatively decided from the remaining effective processors are executed. The initialization diagnosing process of the slave processor which is executed subsequent to the master processor is monitored by the master processor. When an abnormality is recognized, the degeneration to disconnect the slave processor in which the abnormality occurs from the system is executed. Consequently, with respect to any one of the abnormalities of the master processor and the slave processor, the operation with the minimum construction is dynamically realized without hanging up the system.

On the other hand, when the plurality of processors execute programs by using the same program code on the EEPROM provided as a shared memory, a fetching operation occurs in the EEPROM under the domination of the shared bus. In this case, an arbiter circuit of the shared bus executes an occupation control such that the shared bus is always operated only by one processor. Therefore, the other processors have to wait due to the busy bus. According to this phenomenon, as the number of processors increases, the waiting time of the CPU is long and the performance deteriorates.

In the invention, an instruction cache mechanism to store the program code that has once been fetched from the EEPROM serving as a shared memory is built in each of the processors. Due to this, the slave processor can operate the microprogram by using the program code on the cache after the fetching and can release the use of the shared bus to the master processor which mainly executes the accessing operation to the shared section. Therefore, the access to the shared section by the master processor is hardly suppressed by the operations of the slave processors and the deterioration of the bus performance in the multiprocessor system is suppressed. The above and other objects, features, and advantages of the present invention will become more apparent from the following detailed description with reference to the drawings.

DETAILED DESCRIPTION OF THE PREFERRED EMBODIMENT

[System construction and hardware]

Figure 1:
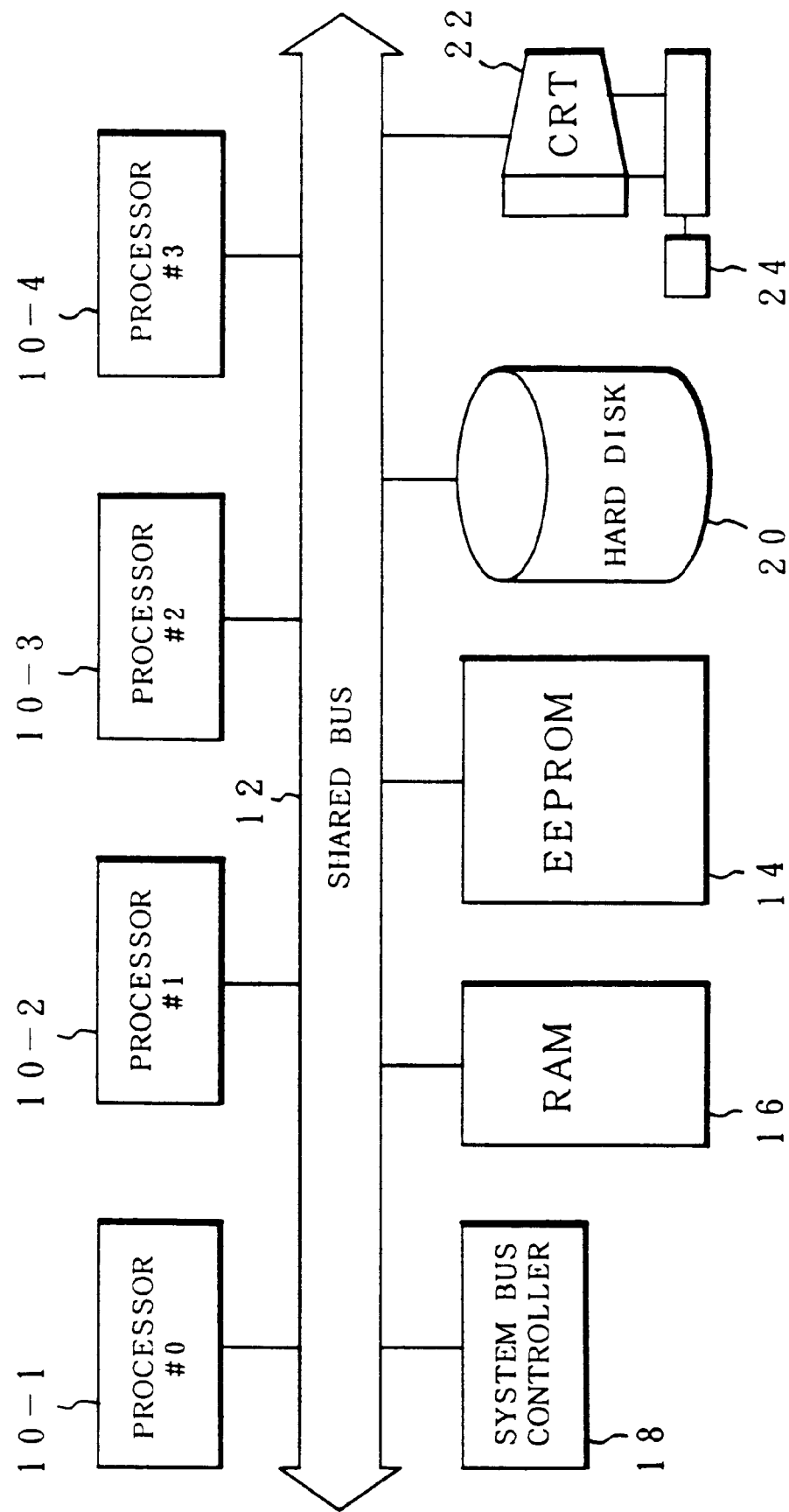
FIG. 1 is a block diagram showing a system construction of the invention.

FIG. 1 is a diagram showing an example of a system construction of a multiprocessor system of the invention. In the embodiment, four processors 10-1, 10-2, 10-3, and 10-4 are connected through a shared bus 12. An EEPROM 14 functioning as a program memory, an RAM 16 functioning as a shared memory, a system bus controller 18, a hard disk 20 as an input/output apparatus, and further, user interface apparatuses 22 and 24 each comprising a keyboard, a mouse, a CRT, and the like are connected to the shared bus 12. An SRAM with a battery backup is used as an RAM 16.

Figure 2:
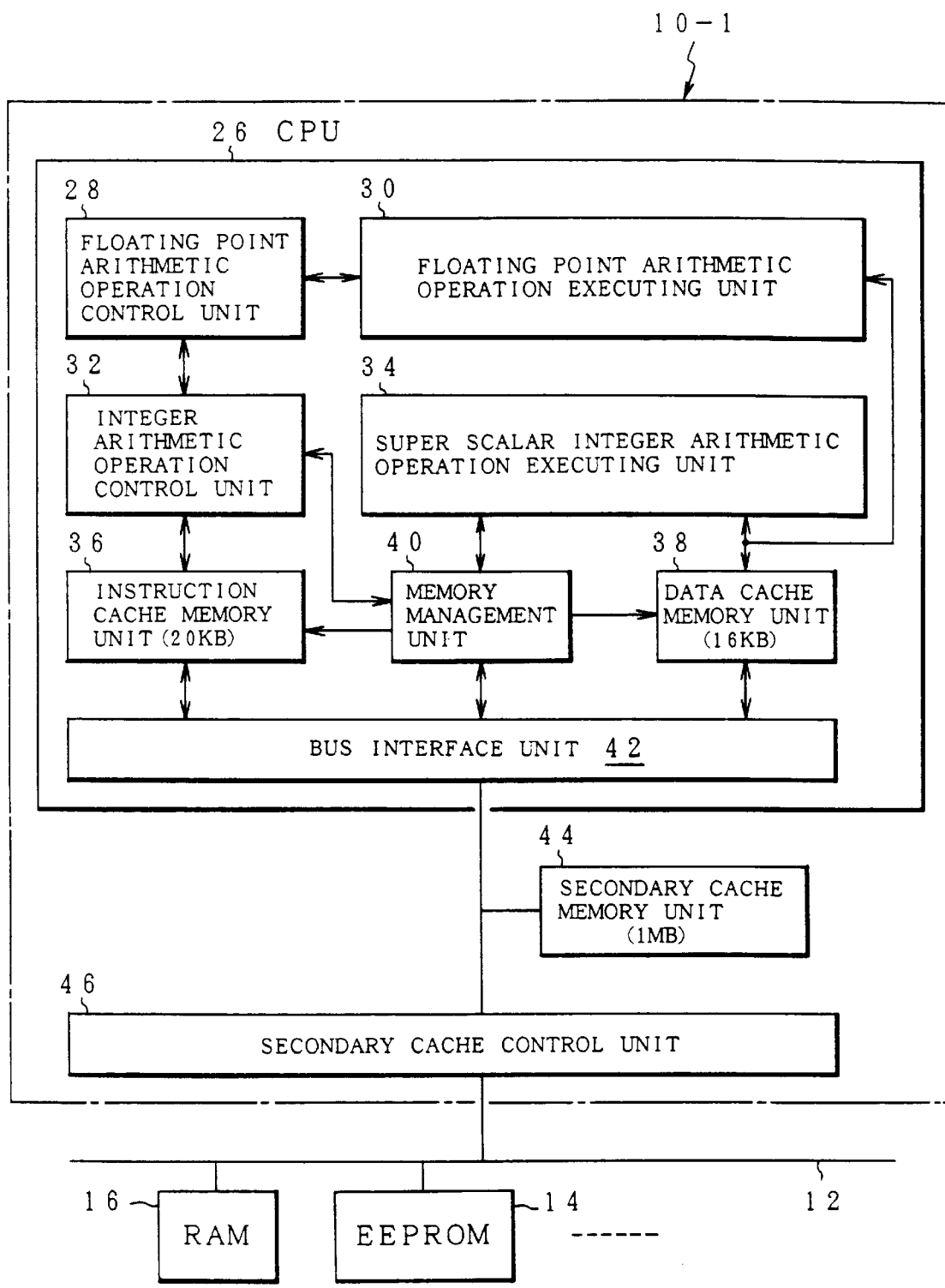
FIG. 2 is a block diagram of a processor which is used in the invention.

Each of the processors 10-1 to 10-4 has a construction, for example, of FIG. 2. FIG. 2 shows the construction of the processor 10-1 as a representative. The processor 10-1 has a CPU 26. The CPU 26 comprises: a floating point arithmetic operation control unit 28; a floating point arithmetic operation executing unit 30; an integer arithmetic operation control unit 32; a super scalar integer arithmetic operation executing unit 34; an instruction cache memory unit 36; a data cache memory unit 38; a memory management unit (MMU) 40; and a bus interface unit 42. The floating point arithmetic operation executing unit 30 executes a floating point arithmetic operation under the control of the floating point arithmetic operation control unit 28. The super scalar integer arithmetic operation executing unit 34 dynamically judges integer arithmetic operation instructions which can be executed in parallel and executes integer arithmetic operations in parallel under the control of the integer arithmetic operation control unit 32.

The instruction cache memory unit 36 is constructed by, for example, 20 kbytes and is cache controlled by the memory management unit 40. The program code fetched from the EEPROM 14 of the shared section which is used in the floating point arithmetic operation control unit 28 and integer arithmetic operation control unit 32 is stored into the instruction cache memory unit 36. When the program code is once stored in the instruction cache memory unit 36, the floating point arithmetic control unit 28 and integer arithmetic operation control unit 32 execute the arithmetic operations using the program code of the instruction cache memory unit 36.

The data cache memory unit 38 has a capacity of, for example, 16 kbytes and stores the data read out from the shared memory area of the RAM 16 provided for an external shared section which is used for the arithmetic operations of the floating point arithmetic operation executing unit 30 and super scalar integer arithmetic operation executing unit 34. A cache control of the data cache memory unit 38 is also executed by the memory management unit (MMU) 40.

Further, the processor 10-1 has a secondary cache memory unit 44 and a secondary cache control unit 46 on the outside of the CPU 26. The secondary cache memory unit 44 is, for example, a data cache of 1 Mbyte. The data fetched from the RAM 16 serving as an external shared memory area is registered in the secondary cache memory unit 44 by the secondary cache control unit 46. Due to this, when a cache hit doesn't occur in the data cache memory unit 38, the memory management unit 40 of the CPU 26 requests a process to the external secondary cache control unit 46 so as to retrieve the secondary cache memory unit 44, thereby obtaining the data in which the cache hit occurred. Each of the other processors 10-2 to 10-4 also has a similar construction as that of the processor 10-1 of FIG. 2. As mentioned above, each of the processors 10-1 to 10-4 which are used in the invention has a construction such that by providing an instruction cache mechanism and a data cache mechanism therein, the occupancy of the shared bus 12 by the access of the EEPROM 14 and RAM 16 as shared sections connected to the shared bus 12 can be suppressed as much as possible.

Figure 3:
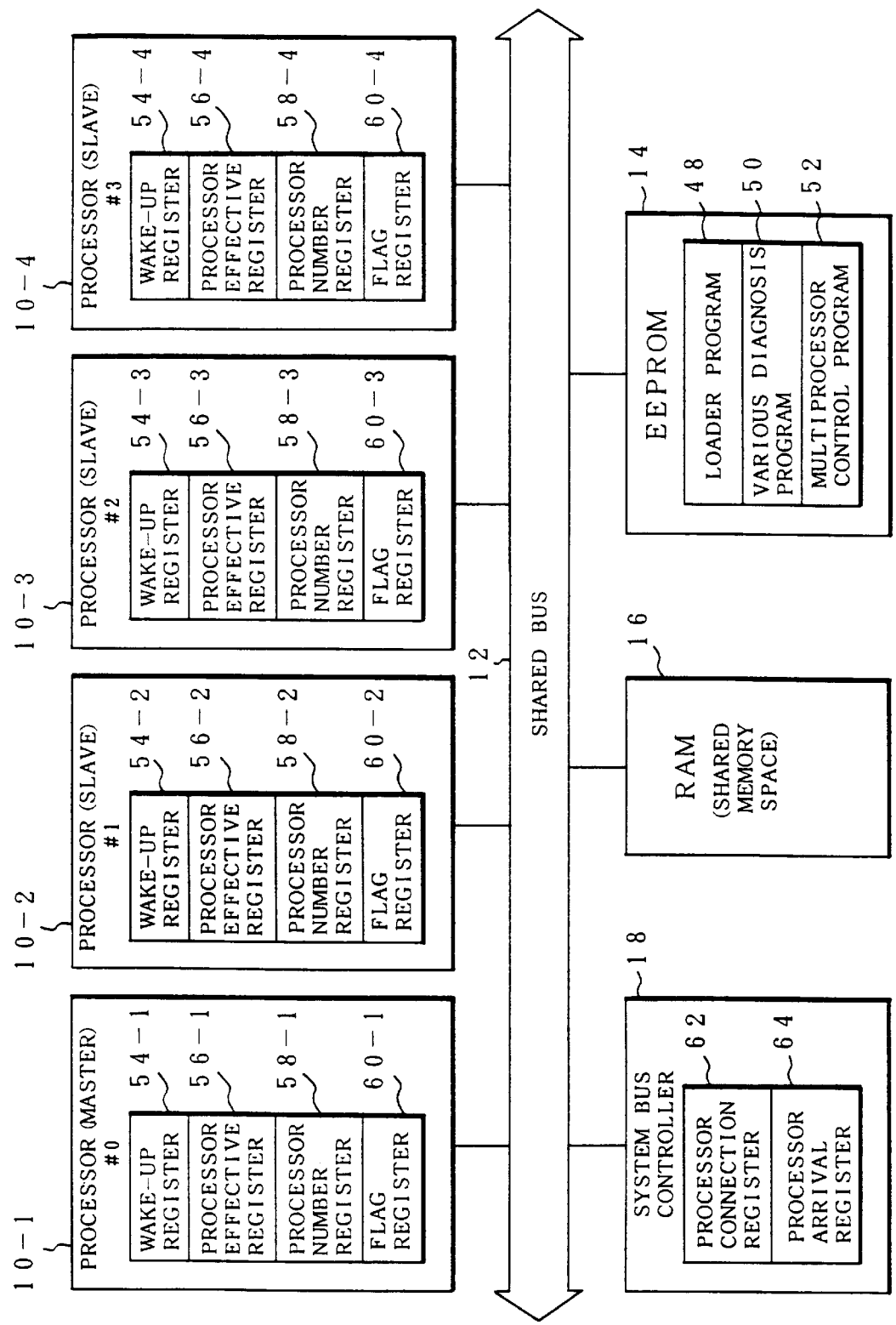
FIG. 3 is an explanatory diagram of an arrangement of registers and programs stored in an EEPROM which are used in the invention.

FIG. 3 shows the processors 10-1 to 10-4 and registers which are arranged for the shared sections and also shows the contents of the programs to be stored in the EEPROM 14 which functions as a program memory. A loader program 48, a various diagnosis program 50, and a multiprocessor control program 52 have preliminarily been stored in the EEPROM 14 to control a resetting process at the time of the system activation by the power turn-on of the processors 10-1 to 10-4, a master/slave allocating process, and further, the operation as a multiprocessor system. The programs stored in the EEPROM 14 simultaneously run in all of the processors 10-1 to 10-4 at the time of the system activation in association with the power turn-on. That is, when the powers of the processors 10-1 to 10-4 are turned on, program counters are simultaneously set to respective reset vectors all together, thereby starting the operations of the processors 10-1 to 10-4. In this instance, all of the reset vectors of the processors 10-1 to 10-4 set the program counter into the same address in the EEPROM 14 connected to the shared bus 12, fetch the program code which is set by the program counter, and allow the same microprogram to run. In this case, the processors 10-1 to 10-4 simultaneously request an acquisition to the shared bus 12. However, a bus arbiter circuit (not shown) of the shared bus 12 allows one of the processors to occupy the shared bus 12 and to execute the fetching operation of the program code in the EEPROM 14. A process to allow the use of the shared bus 12 to the next processor after the bus was recovered is repeated.

The processors 10-1 to 10-4 have, as hardwares, wake-up registers 54-1 to 54-4, processor effective registers 56-1 to 56-4, processor number registers 58-1 to 58-4, and flag registers 60-1 to 60-4, respectively. The system bus controller 18 as a shared section has a processor connection register 62 and a processor arrival register 64.

Figure 4:
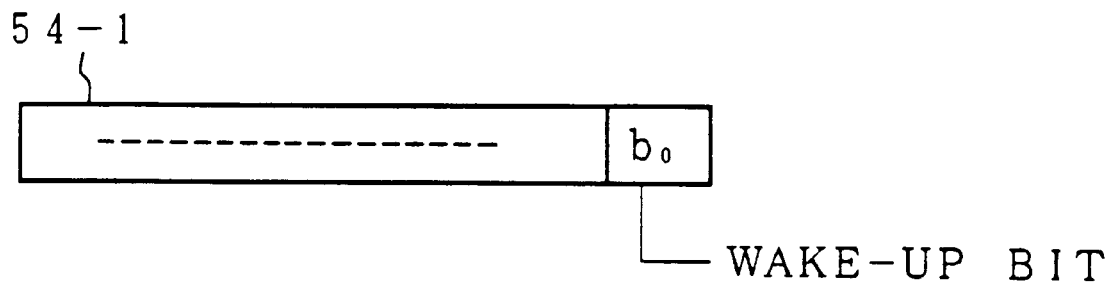
FIG. 4 is an explanatory diagram of a wake-up register.

FIG. 4 shows the wake-up register 54-1 provided for the processor 10-1. When the resetting process is normally finished after the power of the processor 10-1 was turned on, a wake-up bit b0 is set to "1", thereby indicating that the processor 10-1 itself is effective.

Figure 5:
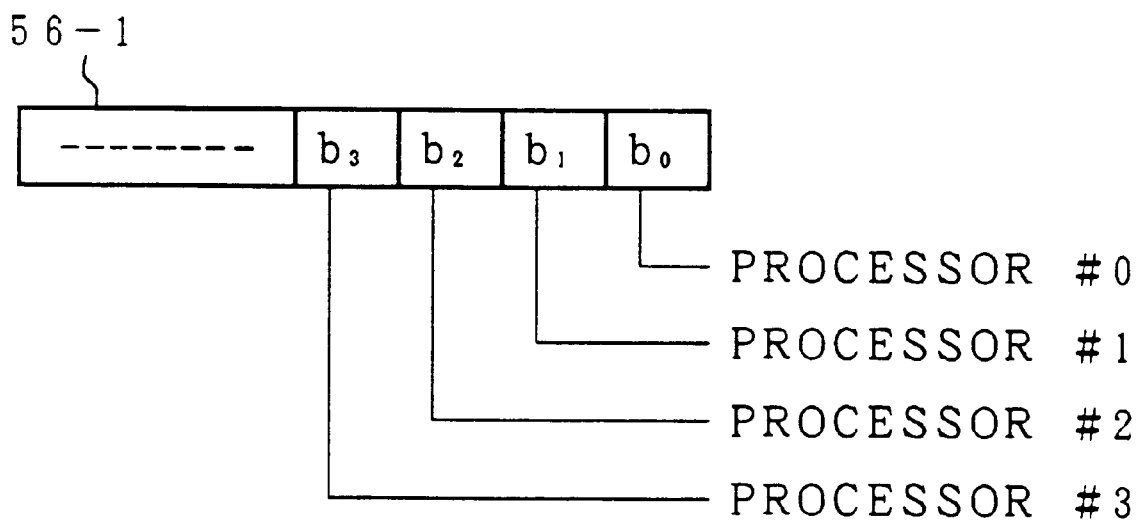
FIG. 5 is an explanatory diagram of a processor effective register.

FIG. 5 shows the processor effective register 56-1 provided for the processor 10-1. Since there are four processors 10-1 to 10-4 in the embodiment, bits b0 to b3 are allocated to the processor effective register 56-1 in correspondence to the processors. When it is now assumed that the processor number #0 is allocated to the processor 10-1, #1 to the processor 10-2, #2 to the processor 10-3, and further, #3 to the processor 10-4, the bits b0 to b3 corresponding to the processor numbers #0 to #3 are allocated to the processor effective register 56-1. When the wake-up bits of the wake-up registers 54-1 to 54-4 provided for the corresponding processors are set to "1", the effective register bits b0 to b3 of the processor effective register 56-1 are set. Therefore, by referring to the processor effective register 56-1, the processors 10-1 to 10-4 can recognize the effective processors connected to the system.

Figure 6:
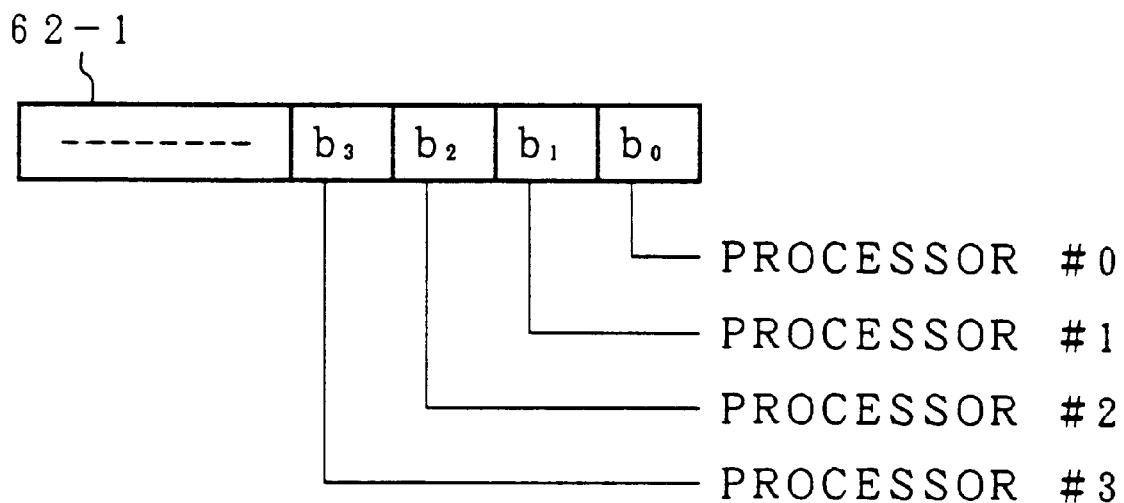
FIG. 6 is an explanatory diagram of a processor connection register.

FIG. 6 shows the processor connection register 62-1 provided for the bus controller 18 as a shared section. The connection register bits b0 to b3 are allocated to the processor connection register 62-1 while allowing the processors 10-1 to 10-4 to correspond to the processor numbers #0 to #3. The register bits b0 to b3 are set to bit "1" by a physical connection to insert the unit machine numbers of the processors 10-1 to 10-4 to the shared bus 12. Due to this, by referring to the processor connection register 62, the processors which are actually connected to the shared bus 12 can be recognized.

Figure 7:
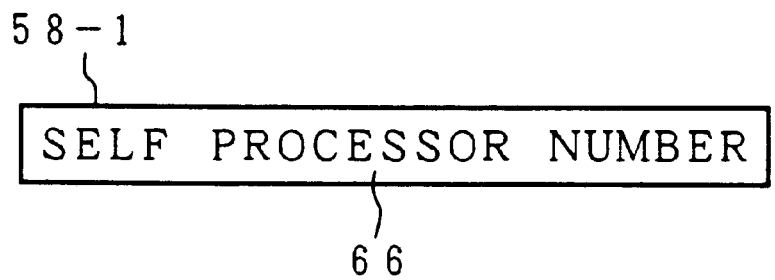
FIG. 7 is an explanatory diagram of a processor number register.

FIG. 7 shows the processor number register 58-1 provided for the processor 10-1. A self processor number 66 which has preliminarily been allocated to the processor 10-1 is stored in the processor number register 58-1. In the invention, the processor numbers #0 to #3 of the processors 10-1 to 10-4 are effectively used when a master is determined by the master/slave allocating process.

Figure 8:
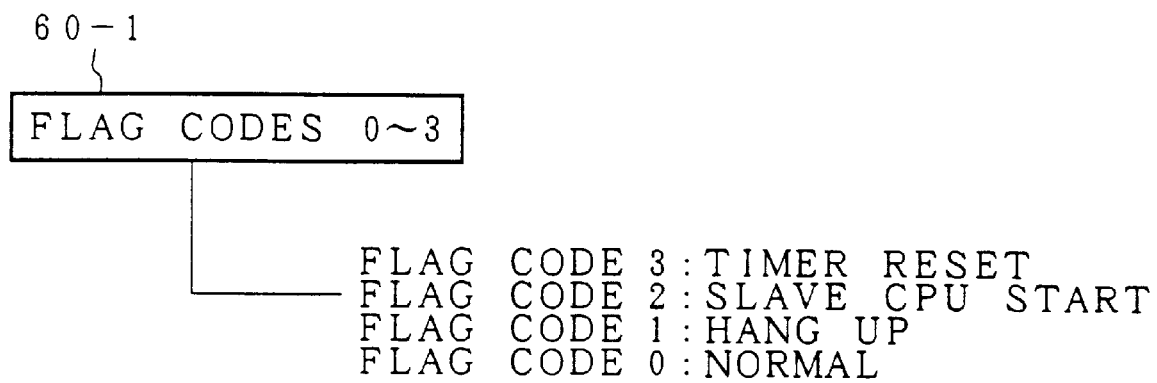
FIG. 8 is an explanatory diagram of a flag register.

FIG. 8 shows the flag register 60-1 provided for the processor 10-1. A flag code 68 indicative of the state of the processor 10-1 is stored in the flag register 60-1. In the resetting process, the master/slave allocating process, and the initialization diagnosing process at the time of the system activation in the embodiment, four kinds of flag codes 0 to 3 are prepared. Flag code 0 indicates a normal operation of the processor. Flag code 1 indicates a hang up due to the abnormality of the processor. Flag code 2 denotes a slave start which is executed in the case where the processor itself becomes the master processor. Further, flag code 3 denotes a time reset at the time of a time-over when monitoring the master or slave.

Figure 9:
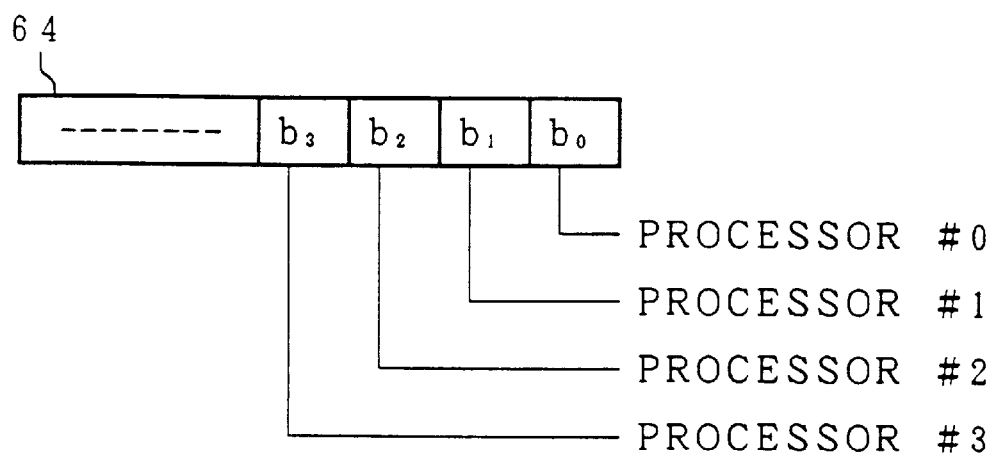
FIG. 9 is an explanatory diagram of a processor arrival register.

FIG. 9 shows the processor arrival register 64 provided for the system bus controller 18 as a shared section. In correspondence to the processors 10-1 to 10-4, the arrival register bits b0 to b3 as shown by the corresponding processor numbers #0 to #3 are allocated to the processor arrival register 64. The arrival register bits b0 to b3 are set to "0" when the processor is executing the process such as an initialization diagnosing process or the like. The arrival register bits b0 to b3 are set to "1" when the processors enter an idle state using a waiting function after the process was finished. Therefore, by referring to the processor arrival register 64, it is possible to recognize whether the processors 10-1 to 10-4 are executing the processes or they are in the idle state after reaching the waiting function.

In this instance, the processor connection register 62 and processor arrival register 64 provided for the system bus controller 18 shown in FIG. 3 are registers to/from which the processors 10-1 to 10-4 commonly write and read. Therefore, with respect the reading and writing operations to the processor connection register 62 and processor arrival register 64, the processors 10-1 to 10-4 must use an atomic instruction which gives an occupied control of the shared bus 12.

[Outline of initializing process]

Figure 10:
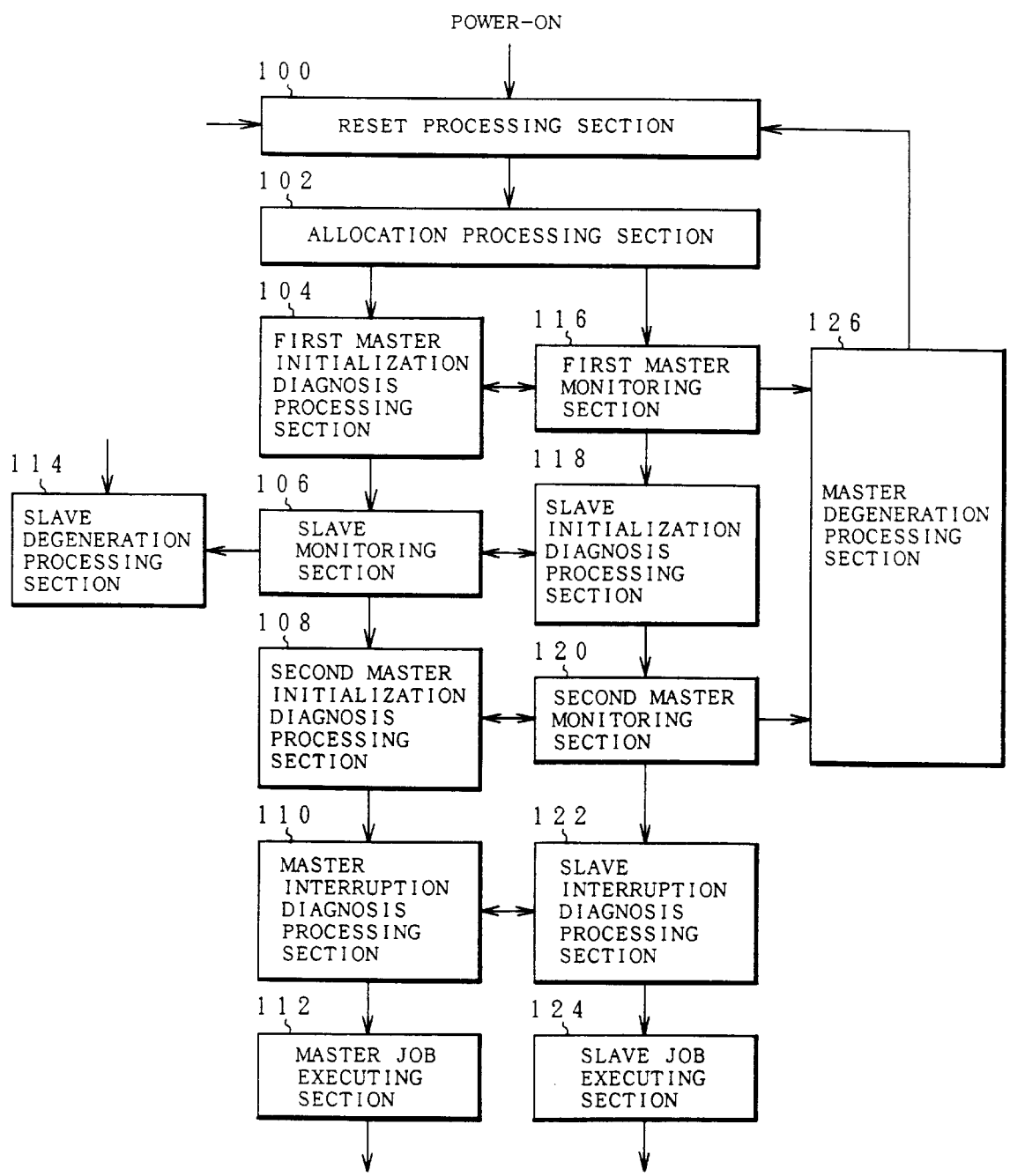
FIG. 10 is a block diagram of system functions of a master/slave allocating process, an initialization diagnosing process, and a monitoring process according to the invention.

FIG. 10 shows a function of a process which is executed just after the power turn-on in the multiprocessor system of the invention. When the power supply (power-on) is executed, a reset processing section 100 operates and the resetting operation is executed in all of the processors 10-1 to 10-4. After the resetting operation was finished, an allocation processing section 102 operates to allocate the master processor and the slave processors from the processors as targets to which the resetting process was normally executed and are made effective in the system. When the allocating process of the master processor and the slave processors by the allocation processing section 102 is finished, a first master initialization diagnosis processing section 104 executes an initialization diagnosing process to the master processor as a target. In parallel with the operation of the first master initialization diagnosis processing section 104, a first master monitoring section 116 which is realized by the slave processor monitors the process of the first master initialization diagnosis processing section 104 which is realized by the master processor.

When the first master monitoring section 116 recognizes an abnormality of the master processor, a master degeneration processing section 126 is activated and the master processor in which the abnormality occurred is disconnected from the system. The processing routine again returns to the process of the reset processing section 100. The resetting process is executed to the remaining processors as targets and, further, the allocation processing section 102 again allocates the master processor and slave processors in the degenerated processor construction.

When the initialization diagnosing process of the master processor by the first master initialization diagnosis processing section 104 is normally finished, the slave processors are activated and the initialization diagnosing process in each slave processor are executed by a slave initialization diagnosis processing section 118. The initialization diagnosing process of each slave processor by the slave initialization diagnosis processing section 118 is monitored by a slave monitoring section 106 which is realized by the master processor. When an abnormality of any one of the slave processors is recognized by the slave monitoring section 106, a slave degenerating processing section 114 is activated and the slave processor in which the abnormality occurred is disconnected from the system. In this case, there is no allocation change of the master processor. The number of the slave processors is merely reduced by one and a reallocation is not executed.

When the initialization diagnosing process of the slave processor by the slave initialization diagnosis processing section 118 is finished, the end of the diagnosis is recognized on the master processor side and the second initialization diagnosing process by a second master initialization diagnosis processing section 108 is executed on the master processor side. The diagnosing process of the second master initialization diagnosis processing section 108 is monitored by a second master monitoring section 120 which is realized by the slave processor in a rule similar to the case of the first master monitoring section 116. When an abnormality of the master processor is recognized by the second master monitoring section 120, the master degeneration processing section 126 is similarly made operative and the master processor is disconnected from the system. The processing routine again returns to the reset processing section 100 and after the resetting process, the reallocation of the master/slaves is executed by the allocation processing section 102 and the initializing process is again started.

When the second initialization diagnosing process of the master processor by the second master initialization diagnosis processing section 108 is finished, a master interruption diagnosis processing section 110 is activated. In response to the slave activation, a slave interruption diagnosis processing section 122 in the slave processor is simultaneously activated. The master interruption diagnosis processing section 110 and slave interruption diagnosis processing section 122 operate in parallel and execute an interruption diagnosing process between the master processor and slave processor.

When the interruption diagnosing process by the master interruption diagnosis processing section 110 and slave interruption diagnosis processing section 122 is finished, a series of the initialization processes in association with the power-on-start are finished, and the processing routine advances to the processes by a master job executing section 112 and a slave job executing section 124. Specifically speaking, after the normal end of the initialization diagnosing process, the master processor loads a program to make the system operative from the hard disk 20. During the loading, the slave processors are in an idle loop. When the program loading from the hard disk by the master processor is finished, the slave activation is executed to the slave processors in order to distribute and execute the job and a job is executed in parallel as a multiprocessor system.

Figure 11:
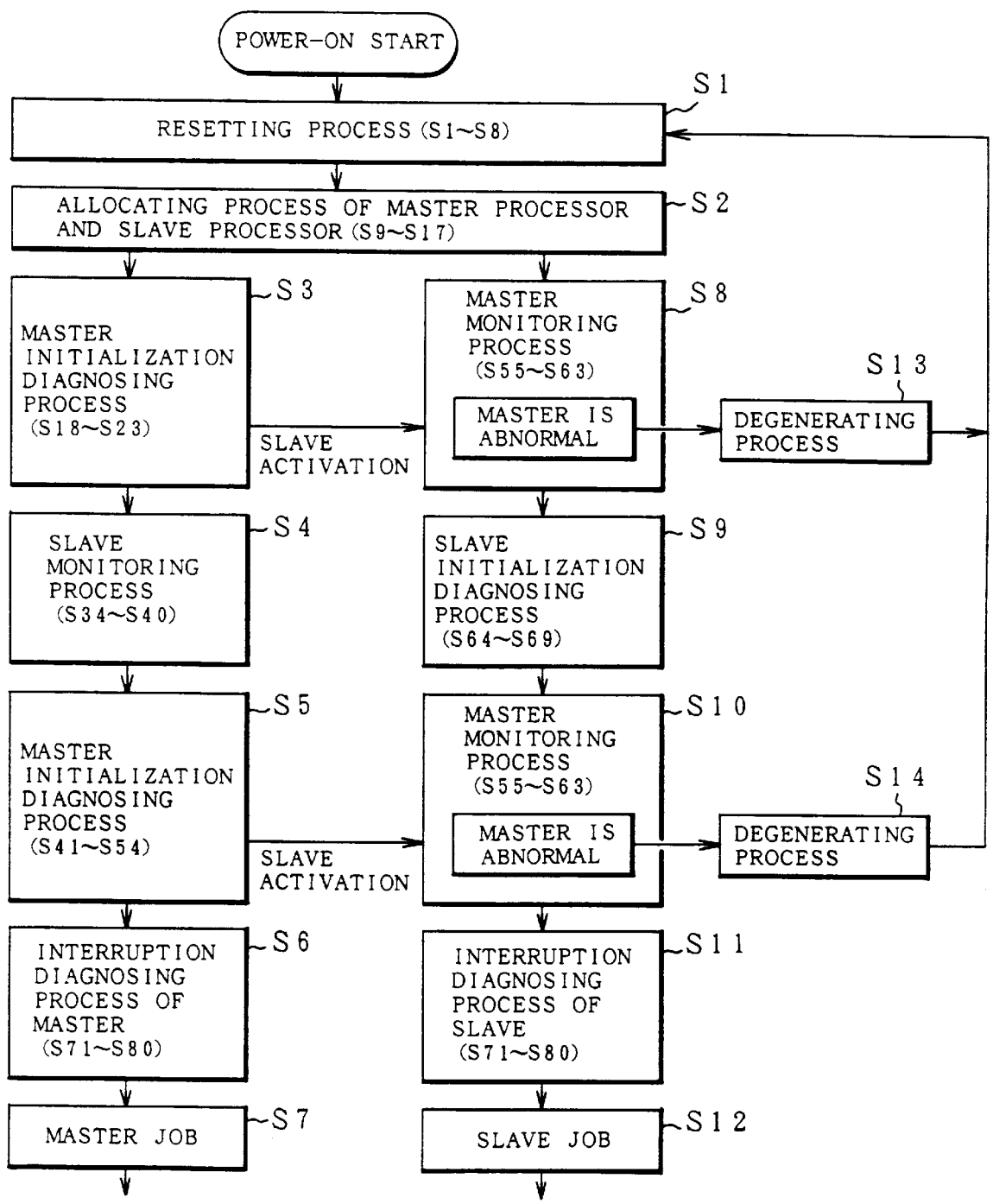
FIG. 11 is a flowchart for the master/slave allocating process, initialization diagnosing process, and monitoring process according to the invention.

FIG. 11 is a flowchart showing the outline of the initializing process of the invention. The flowchart corresponds to the functional block diagram shown in FIG. 10. In response to the power-on-start, the resetting process of the processors 10-1 to 10-4 is executed in step S1. Subsequently in step S2, the allocating process of the master processor and slave processors is executed. After completion of the allocating process, the processes in steps S3 to S7 are executed on the master processor side. In parallel with the above processes, the slave processor executes processes in steps S8 to S12 in parallel. Namely, when the master initialization diagnosing process is executed in step S3, the slave processor executes a master monitoring process in step S8. When an abnormality of the master is recognized, the degenerating process to disconnect the master processor from the system is executed in step S13 and the processing routine returns to the processes from step S1. When the master initializing diagnosis in step S3 is finished, a slave activation is executed and the initialization diagnosing process of the slave processor shown in step S9 is executed. The initialization diagnosing process of the slave processor is monitored by the slave monitoring process of the master processor shown in step S4. When an abnormality of the slave processor is recognized in the slave monitoring process, it is sufficient to disconnect the slave processor in which the abnormality occurred from the system. It will be obviously understood that the processes are repeated from the resetting process in step S1 if necessary.

When the initialization diagnosing process of the slave processor in step S9 is finished, the initialization diagnosing process at the second time shown in step S5 is executed on the master processor side. The initialization diagnosing process in step S5 is monitored by the master monitoring process in step S10 of the slave processor. When an abnormality of the master processor is recognized, the processing routine advances to the degenerating process in step S14 and the master processor in which the abnormality occurred is disconnected from the system. The processing routine returns to the resetting process in step S1 and the reallocation of the master and slaves is executed in step S2.

When the second initialization diagnosing process of the master processor is finished in step S5, the slave activation is executed. As a result, the interruption diagnosing process of the master shown in step S6 and the interruption diagnosing process of the slave shown in step S11 are executed in parallel. When the interruption diagnosing processes of the master and slaves are finished, all of the series of initializing processes are finished and a processing routine advances to a master job shown in step S7 and a slave job shown in step S12.

[Resetting process]

Figure 12:
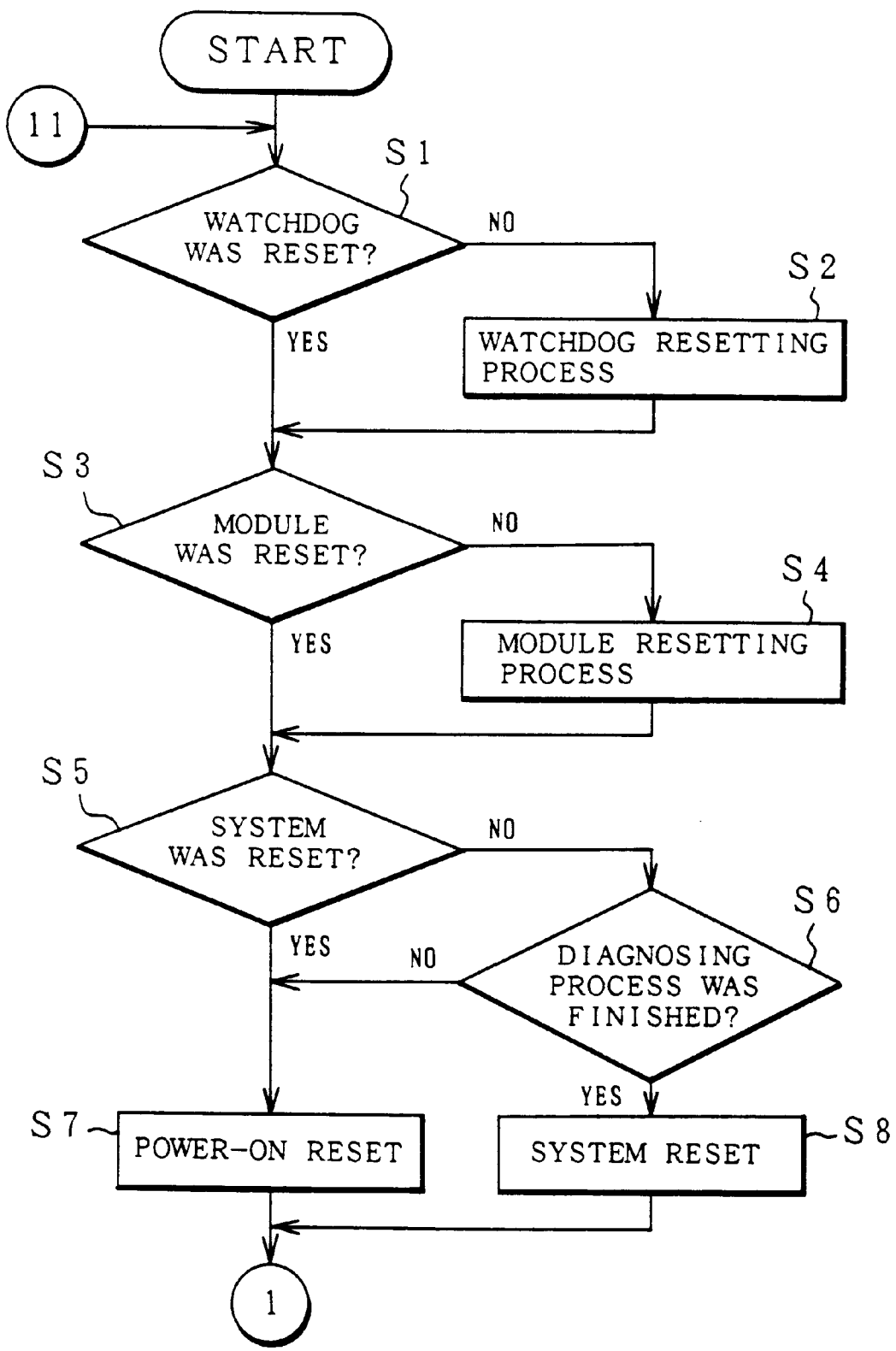
FIG. 12 is a flowchart for a resetting process in FIG. 11.

A flowchart of FIG. 12 shows the details of the resetting process shown in step S1 in FIG. 11. When the power-on-start is executed by turning on the power, a check is first made in step S1 to see if watch dog timers for monitoring a program violence provided for the processors 10-1 to 10-4 have been reset or not. When they aren't reset yet, step S2 follows and the resetting process of the watch dog timers is executed. In step S3, a check is made to see if the resetting itself of the modules of the processors 10-1 to 10-4 have been finished or not. When they aren't finished yet, a module resetting process is executed in step S4. A check is made in step S5 to see if the system has been reset. When the system resetting is normally finished, a power-on-reset is executed in step S7. When the system resetting isn't finished yet in step S5, step S6 follows and a check is made to see if the diagnosing process has been finished. When it is finished, the power-on-reset is executed in step S7 without performing the system reset. When the diagnosing process isn't finished yet in step S6, the system is reset in step S8.

In the check about the end of the diagnosing process in step S6, in the case where the processor becomes abnormal during the initialization diagnosing process and is disconnected from the system and the processing routine returns to the resetting process, the power-on-reset is performed in the state during the diagnosis, the diagnosis which has already been executed up to the halfway is not made invalid, the system is reset in step S8, the initializing diagnoses which have already been executed are not executed again, and the remaining diagnosing processes after the reconstruction are enabled to be executed.

[Master/slave allocating process]

Figure 13:
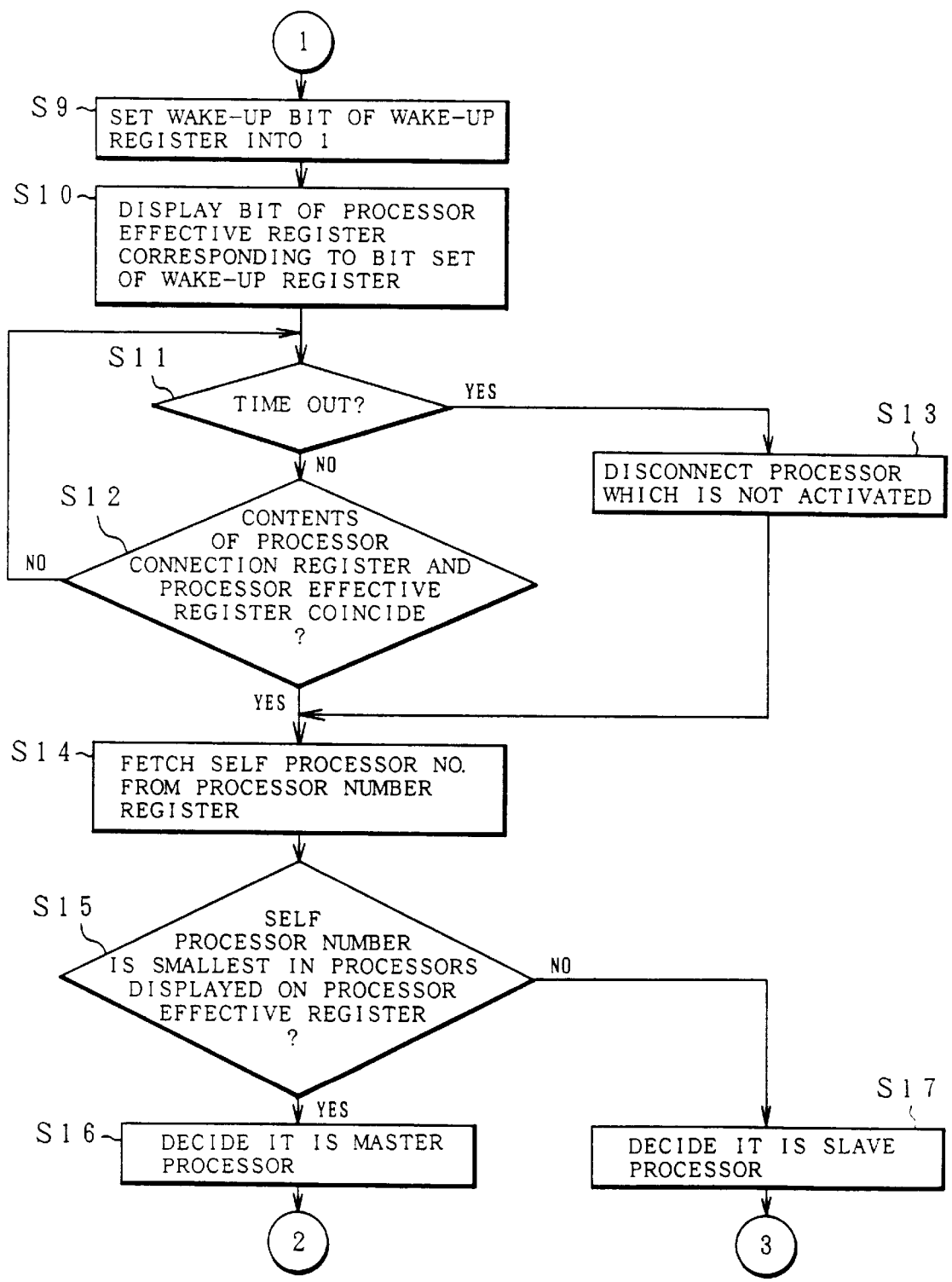
FIG. 13 is a flowchart for the master/slave allocating process in FIG. 11.

A flowchart of FIG. 13 shows the details of the allocating process of the master processor and slave processors shown in step S2 in FIG. 11. When the resetting process of FIG. 12 is finished, in step S9, the processors 10-1 to 10-4 set the wake-up bits of the wake-up registers 54-1 to 54-4 provided for the processors themselves to "1". Consequently, the bits corresponding to the wake-up bits of the wake-up registers 54-1 to 54-4 in which the wake-up bits of the processor effective registers 56-1 to 56-4 provided for all of the processors 10-1 to 10-4 have been set are set to "1". The processors which are made effective for the system are displayed. By referring to the self processor effective registers 56-1 to 56-4, therefore, the processors 10-1 to 10-4 can recognize the processors that are at present effective in the system.

Subsequently in step S11, a check is made to see if the timer activated for the processor allocating process has timed out or not. If NO, a check is made in step S12 to see if the contents of the processor connection register 62 provided for the system bus controller 18 coincide with the contents of the processor effective registers 56-1 to 56-4 that are possessed by the processors 10-1 to 10-4 or not. When they coincide, step S14 follows. When they don't coincide, the wake-up bits are set and, since it is assumed that there is a processor which isn't activated, the processes in steps S11 and S12 are repeated. When the time-out occurs in step S11, step S13 follows. The processor which isn't activated is recognized in the processor effective register and is disconnected from the system. The disconnection of the processor in step S13 corresponds to the non-installing state in which the processor module itself is not connected to the shared bus 12, and the processor that is not installed is disconnected from the system. In step S14, the processor numbers of the processor number registers 58-1 to 58-4 provided respectively for the processors 10-1 to 10-4 are read. In step S15, a check is made to see if the self processor number is smallest or not among the processors displayed in the processor effective registers 56-1 to 56-4. When the self processor number is smallest, step S16 follows and it is decided that the self processor is a master processor. When the self processor number is not smallest, step S17 follows and it is determined that the self processor is a slave processor. In case of the embodiment of FIG. 3, since the processor No. #0 of the processor 10-1 is smallest, the processor 10-1 is determined to be the master processor. The remaining processors 10-2 to 10-4 are decided to be the slave processors. Explanation will now be made hereinbelow on the assumption that the processor 10-1 is the master processor and the processors 10-2 to 10-4 are the slave processors.

In the process of FIG. 13, the processor of the smallest processor No. is smallest is set to the master processor. However, the processor of the largest processor No. can be also set to the master processor on the contrary. In any of the above cases, in a plurality of processors which are made effective to the system, the relative allocation such that one of them is allocated to the master processor and the remaining processors are allocated to the slave processors on the basis of the comparison of the processor numbers is executed.

[Master initialization diagnosing process and monitoring by slave]

Figure 14:
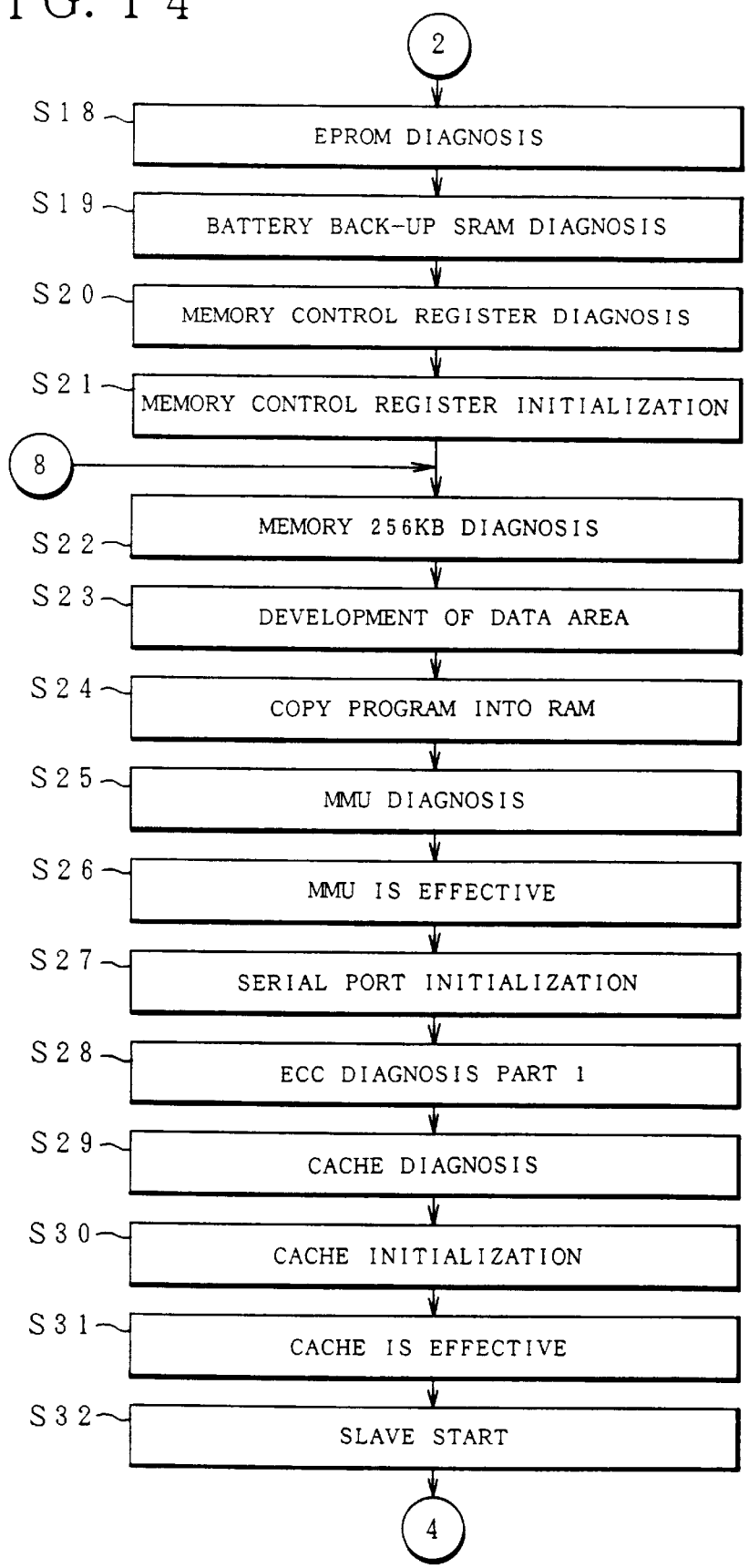
FIG. 14 is a flowchart for a first master initialization diagnosing process in FIG. 11.

FIG. 14 shows the details of the initialization diagnosing process in the master processor at the first time in step S3 in FIG. 11. First in step S18, a diagnosis by the sum check of the EEPROM 14 is executed by only the master processor 10-1. In step S19, a diagnosis is executed by the comparison check and sum check of the RAM 16 by using the SRAM which is backed up by a battery. In step S20, a comparison test is performed to discriminate whether the memory control register can normally be accessed or not. In step S21, the initializing process for recognizing the installation of the memory capacity and setting into the memory control register is performed. In step S22, a memory diagnosis is executed with respect to the area of 256 kbytes reserved in the EEPROM 14. In step S23, a data area for the diagnosing process and a debugger is developed in a work area in the EEPROM. In step S24, the program in the EEPROM 14 is developed in the SRAM 16 and the mode is switched from a boot mode to a passthrough mode.

The boot mode and the passthrough mode will now be described. By resetting the master processor 10-1, the program counter designates address 0 in the memory and tries to start the process. However, there is a case where nothing actually exists in address 0 in the memory and, for example, address 0 is set to address 100. Therefore, address 0 of the address counter at the time of resetting of the processor is accessed like address 100 in the memory by the hardware. Such a process is referred to as a boot mode. For the boot mode, a state in which the value of the address counter of the processor and the memory address correspond in a one-to-one corresponding state is referred to as a passthrough mode.

In step S25, functions of the register access and page entry of the memory management unit 40 provided for the CPU 26 of the processor 10-1 in FIG. 2 are checked. Such a function check is an MMU diagnosis. In step S26, the memory management unit 40 is made effective, thereby setting a translation mode. In this state, the processing routine advances to step S27 and a diagnosis and an initial setting of a serial port are performed. In step S28, a single bit abnormality of the ECC and the operation for bit concealment are checked as an ECC diagnosis part 1. In step S29, a caching invalidating operation and a simulation of an access test of a data tag are executed as a cache diagnosis to the instruction cache memory unit 36 and data cache memory unit 38 as targets provided for the master processor 10-1 in FIG. 2. After completion of the cache diagnosis, a cache initialization to invalidate the contents of the cache memory is executed in step S30. In step S31, only the instruction cache memory unit 36 is set into an effective state.

In the above-mentioned manner, the first initialization diagnosing process of the master processor 10-1 is finished. In step S32, a slave start to activate the slave processor is performed. Specifically speaking, a flag code of the flag register 60-1 in FIG. 8 provided for the master processor 10-1 is set into a flag code 2 indicative of the slave start.

Figure 15:
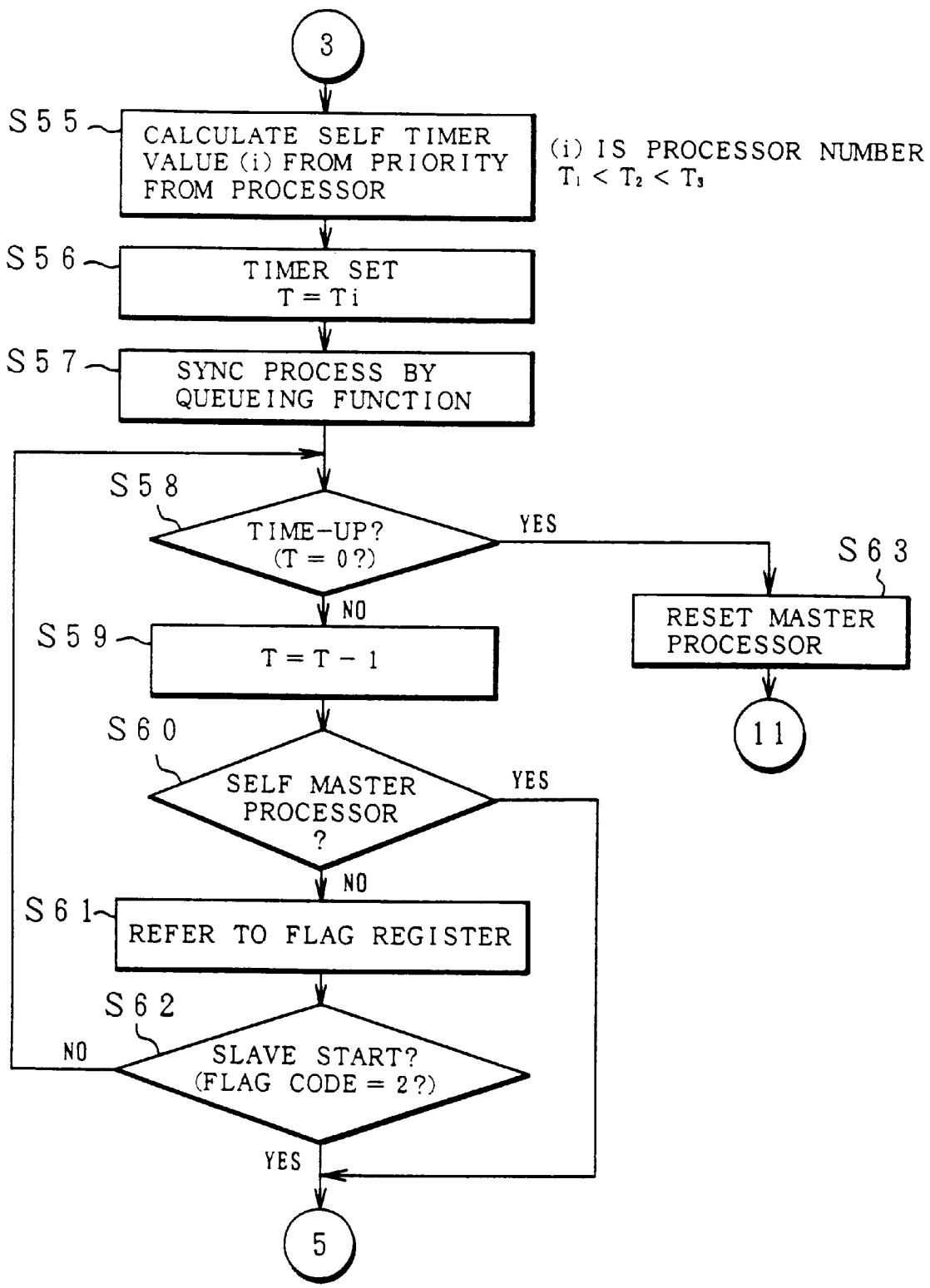
FIG. 15 is a flowchart showing a master monitoring process in FIG. 11.

A flowchart of FIG. 15 shows the details of the master monitoring process which is executed in each of the slave processors 10-2 to 10-4 in the idle state in parallel with the initialization diagnosing process of the master processor 10-1 in FIG. 14. Each of the slave processors 10-2 to 10-4 first calculates a self timer value Ti at the priority according to the self processor number in step S55. For example, the slave processor 10-2 of the processor No. #1 calculates a timer value T1. The slave processor 10-3 of the processor No. #2 calculates a timer value T2. Further, the slave processor 10-4 of the processor No. #3 calculates a timer value T3. The timer values T1 to T3 are set so as to have a relation $$T1 < T2 < T3$$

such that as the priority of the processor number is high, the timer value is small.

For example, T2=2×T1 and T3=3×T1 are set for T1. In step S56, the calculated timer value T1 is set into the timer T. In step S57, a synchronizing process by the waiting function is executed. The synchronizing process by the waiting function is performed with reference to the processor arrival register 64 shown in FIG. 9. That is, when all of the master processor 10-1 and slave processors 10-2 to 10-4 finish the processes and enter the idle state due to the waiting function, all of the bits b0 to b3 of the processor arrival register 64 corresponding to the processors 10-1 to 10-4 are set to 1. Therefore, with reference to the processor arrival register 64, the timing at which all of the bits corresponding to the effective processor are set to 1 is recognized as a synchronizing timing. The processing routine advances to the processes in step S58 and subsequent steps.

In step S58, the down counting of the timer T in which the timer value Ti was set in step S56 is started. The subtraction of the timer value T of every unit time in step S59 is repeated until T=0 and the timer times up in step S58. When the subtraction of the timer value of the unit time is finished in step S59, a check is made to see if the self processor is a master processor or not in step S60. If it is the master processor, the processes in steps S61 and S62 are not executed. If it is the slave processor, step S61 follows and, by referring to the self flag register, a check is made to see if the operating mode is the slave start mode in which the flag code is equal to 2 or not in step S62. The processes in steps S58 to S62 are repeated until the slave start is recognized. When the initialization diagnosing process in FIG. 14 by the master processor 10-1 is normally finished before the timer times up in step S58, the slave start is recognized by the flag code 2 of the flag register in step S62 and the processing routine advances to the next process.

On the other hand, in the case where the master processor 10-1 is abnormal and the initialization diagnosing process is not normally executed and the timer times up without causing the slave start by the flag code 2, step S63 follows and the master processor 10-1 is reset. Due to this, the master processor is disconnected from the system. The processing routine is again returned to the resetting process from step S1 in FIG. 12. With respect to the slave processors 10-2 to 10-4 which were left in the master/slave allocating process in FIG. 13, the allocating process of the master processor and slave processors is again executed and a similar initializing process is performed.

Figure 16:
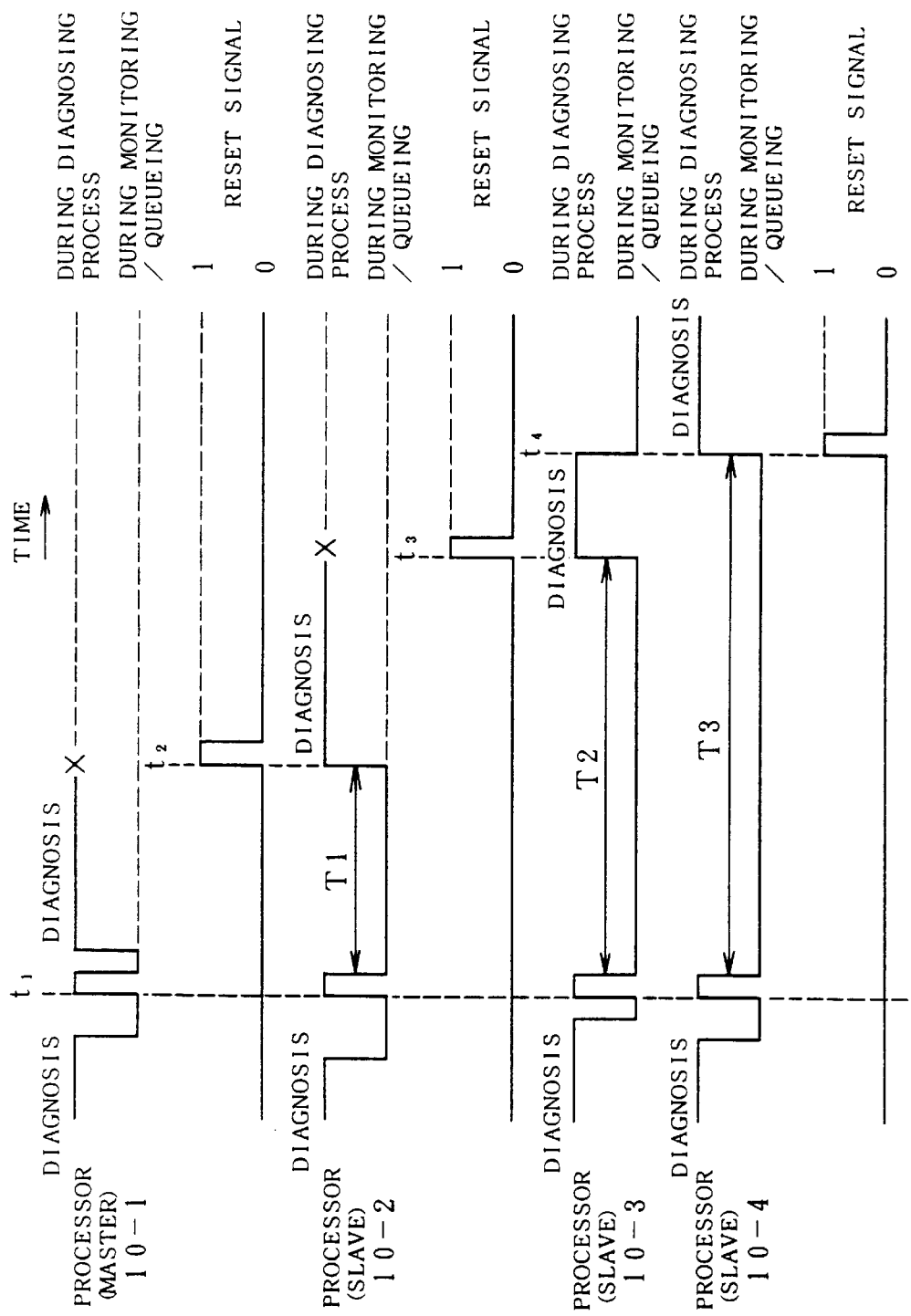
FIG. 16 is a timing chart for the master monitoring process in FIG. 15.

A degenerating process in the case where an abnormality occurs in the master processor during the initializing diagnosis will now be described. In FIG. 16, after the synchronization by the waiting function was obtained at time t1, the master processor 10-1 starts the initialization diagnosing process and the slave processors 10-2 to 10-4 execute the master monitoring. In this case, the timer value T1 of the slave processor 10-2 is smallest. The timer value T2 of the slave processor 10-3 is the next small value. The timer value of the slave processor 10-4 of the lowest priority is set to the largest value T3. When an abnormality occurs in the master processor 10-1 during the diagnosis and the slave processor 10-2 times up with the elapse of time T1 at time t2, a reset signal is generated, the master processor 10-1 is disconnected from the system, and the master slave is again allocated. By the reallocation, the processor 10-2 is newly set to the master processor and the diagnosing process is started. However, it is assumed that the processor 10-2 which was newly set to the master processor also causes an abnormality during the diagnosis. Therefore, the set time T2 of the slave processor 10-3 times over at time t3, a resetting signal is generated, and the processor which was newly set to the master processor is disconnected from the system. The processor 10-3 is set to the new master processor and starts the diagnosing process and normally finishes the diagnosis at time t4. By the normal end of the diagnosis at time t3 as a master processor by the processor 10-3, the slave start is executed for the remaining slave processor 10-4. The initialization diagnosing process of the slave processor 10-4 is performed.

[Slave initialization diagnosing process and monitoring by master]

Figure 17:
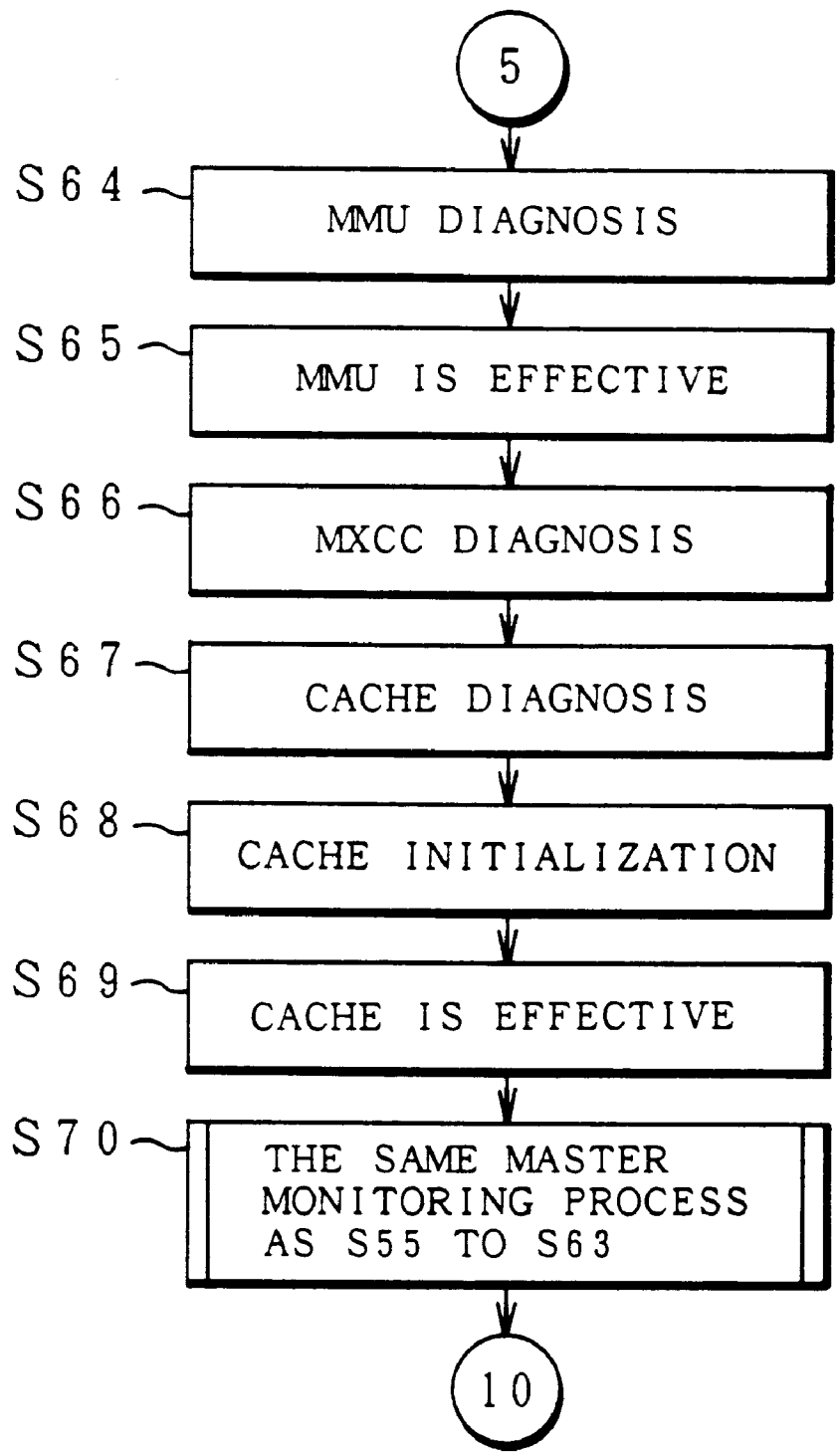
FIG. 17 is a flowchart for a slave initialization diagnosing process in FIG. 11.

A flowchart of FIG. 17 shows the details of the initialization diagnosing process of the slave processor shown in step S9 in FIG. 11. First in step S64, functions of the register access and page entry of the memory management unit 40 provided for the self CPU 26 of each of the slave processors 10-2 to 10-4 are checked. In step S65, the memory management unit 40 is made effective and the translation mode is set. In step S66, diagnoses of the secondary cache memory unit 44 and secondary cache control unit 46 provided for each of the slave processors 10-2 to 10-4 are executed by simulations. In step S67, the caching invalidating operation and access test of the data tag of the instruction cache memory unit 36 and data cache memory unit 38 provided for the CPU 26 are executed as a cache diagnosis. In step S68, an initialization to invalidate the cache memory is executed. In step S69, only the instruction cache memory unit 36 is made effective in step S69 and the series of initialization diagnosing processes on the slave side are finished. A process in the next step S70 shows processes in steps S55 to S63 shown in FIG. 15 for realizing the master monitoring process shown in step S10 in FIG. 11.

Figure 18:
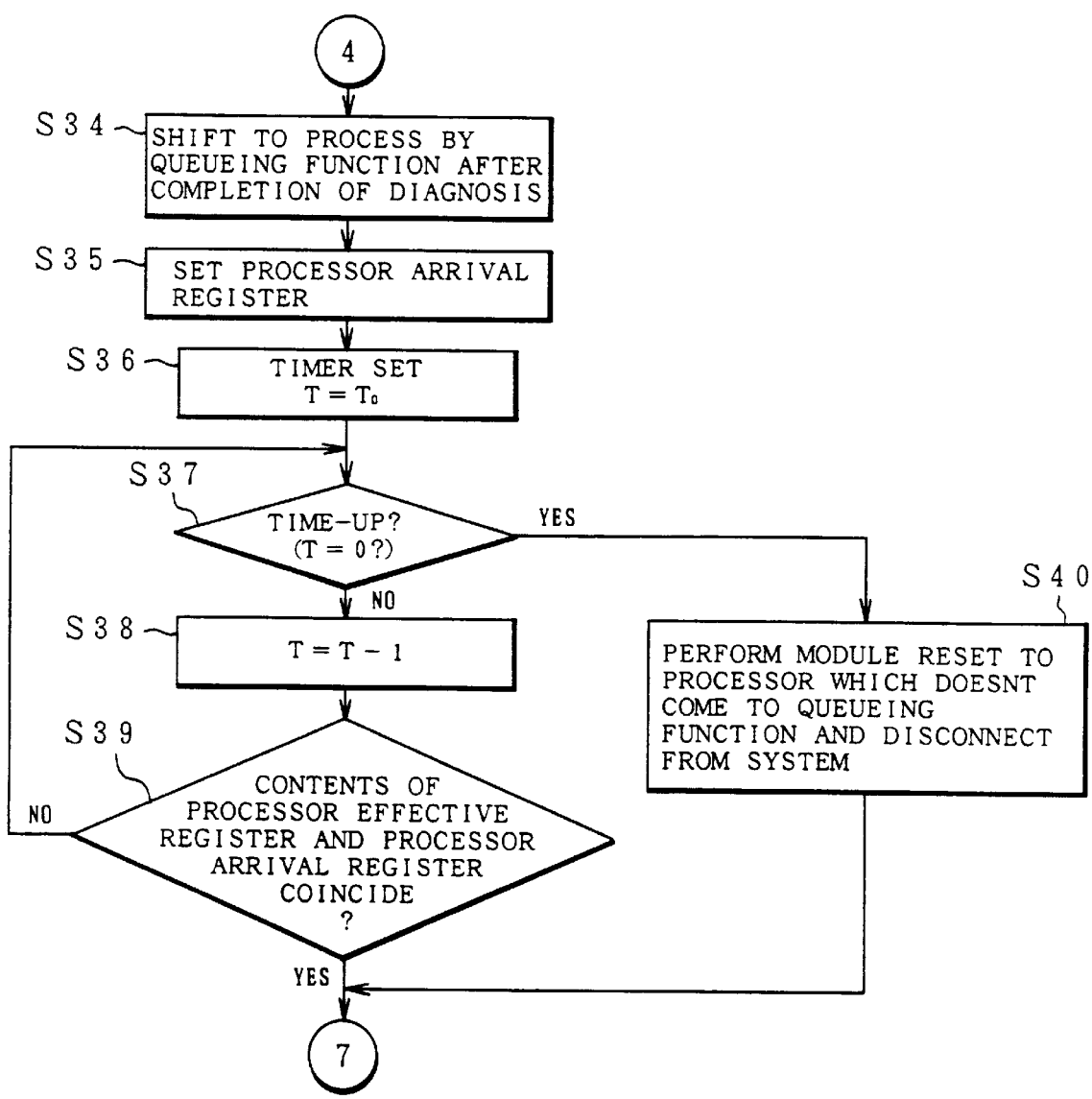
FIG. 18 is a flowchart for a slave monitoring process in FIG. 11.

A flowchart of FIG. 18 shows the details of the slave monitoring process that is executed in the master processor 10-1 in parallel with the slave initialization diagnosing process in FIG. 17. As for the monitoring of the slave processors 10-2 to 10-4 by the master processor 10-1, first in step S34, the processing routine advances to the process by the queueing function, namely, the idle state after completion of the initialization diagnosing process of the master processor 10-1. Subsequent to the progress to the idle state, "1" is set into the corresponding bit b0 of the master processor 10-1 of the processor arrival register 64 provided for the system bus controller 18 in step S35. The predetermined timer value T0 of the slave monitoring time is set into the timer T in step S36. Step S37 follows. In step S37, a check is made to see if the timer T has timed up or not. Until the timer times up, the timer value T is subtracted every unit time in step S38. When the subtraction of the timer value is finished in step S38, a check is made in step S39 to see if the contents of the processor effective register 56-1 provided for the master processor 10-1 coincide with the contents of the processor arrival register 64 provided for the system bus controller 18 or not. When the initialization diagnosing process is normally finished in the slave processors 10-2 to 10-4 which are performing the initializing process, the system enters the idle loop due to the queueing function, so that the corresponding bits b1 to b3 of the processor arrival register 64 are set to 1. Therefore, all of the bits including the master processor 10-1 are set to 1 and the contents of the processor arrival register coincide with the contents of the processor effective register 56-1. It is regarded that the initialization diagnosing processes of the slave processors 10-2 to 10-4 were normally finished, so that the processing routine advances to the next process. On the other hand, even if the timer timed up in step S37, in the case where the slave processor which doesn't come to the queueing function exists with reference to the processor arrival register 64, it is judged that such a slave processor caused an abnormality, so that the degenerating process for disconnecting the slave processor from the system by performing the module reset is executed.

Figure 19:
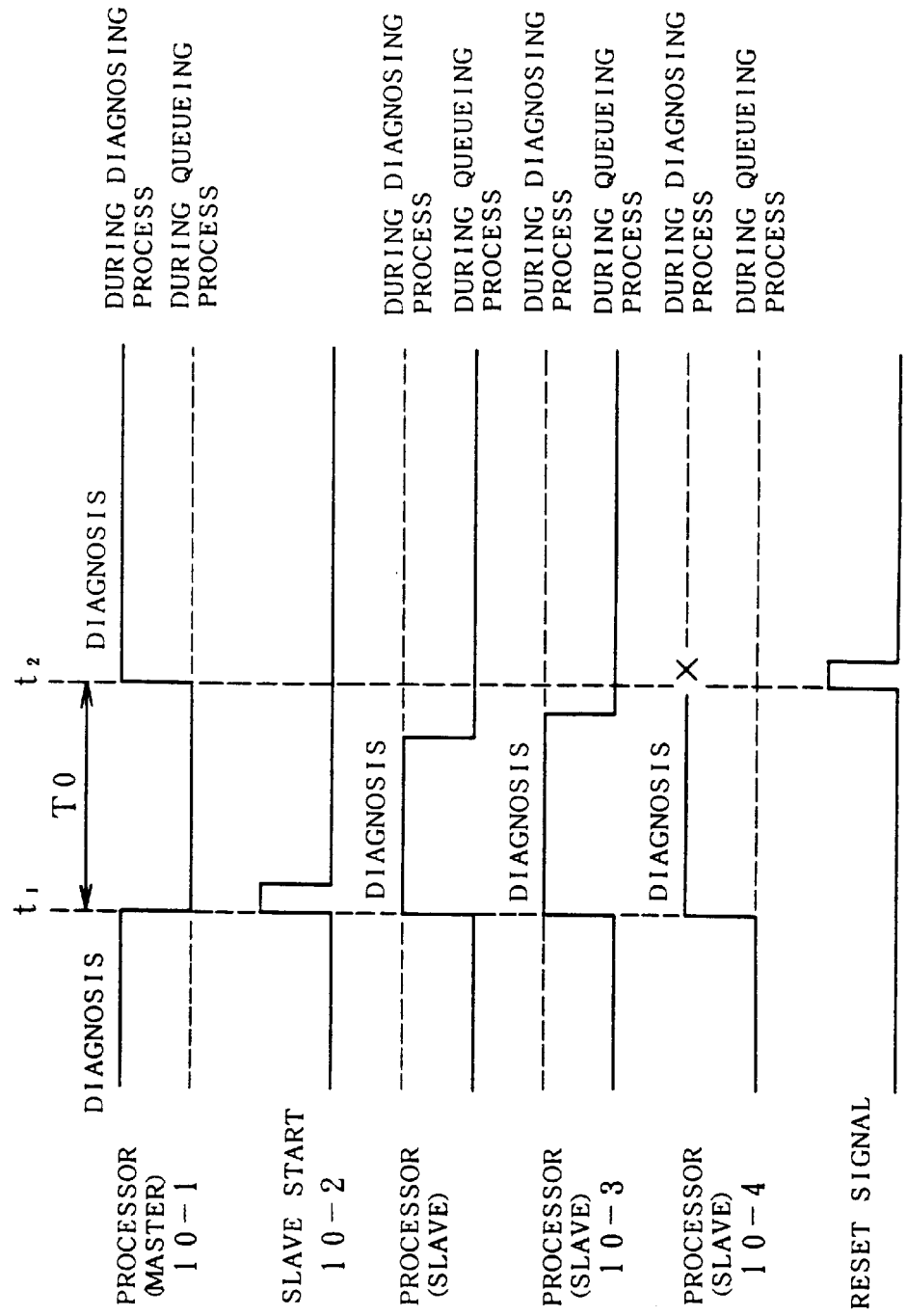
FIG. 19 is a timing chart for the slave monitoring process in FIG. 18.

FIG. 19 shows a monitoring process of the slave processors 10-2 to 10-4 by the master processor 10-1. When the diagnosis of the master processor 10-1 is finished at time t1, the diagnosing process of the slave processors 10-2 to 10-4 by the slave start is started. In the master processor 10-1, the time elapse by the timer value T0 from the slave start of the diagnosis end is monitored. In the case where, for example, the slave processor 10-4 doesn't come to the waiting function at time t2 at which the set time T0 times up, a resetting signal for module resetting is output to the slave processor 10-4, thereby disconnecting the slave processor from the system.

[Second master initialization diagnosing process and interruption diagnosing process]

Figure 20:
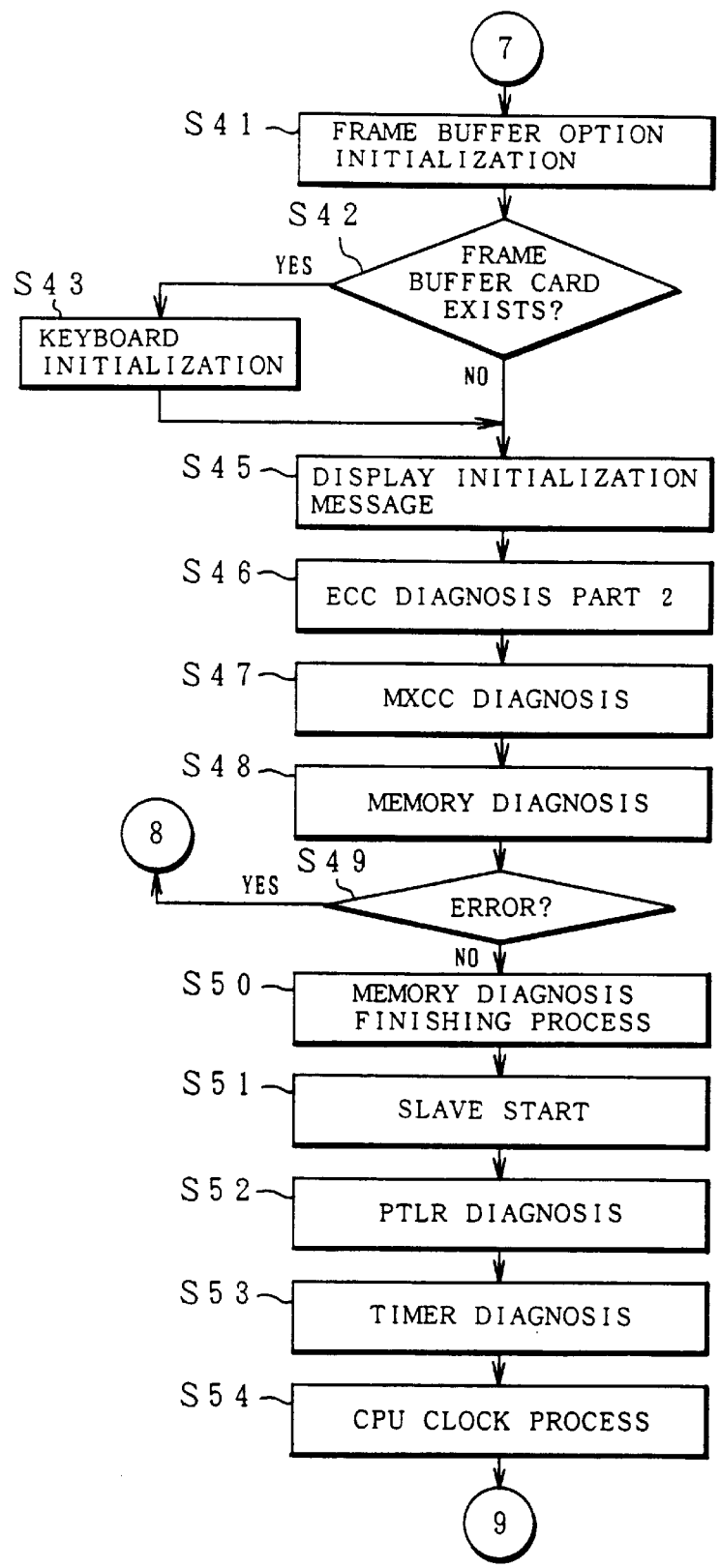
FIG. 20 is a flowchart for a second master initialization diagnosing process in FIG. 11.

A flowchart of FIG. 20 shows the details of the second initialization diagnosing process of the master processor 10-1 shown in step S5 in FIG. 11. First in step S41, an installation check of a system bus card provided as a frame buffer option and a diagnosis initialization are executed. In step S42, the presence or absence of the frame buffer card is discriminated. If the frame buffer card exists, step S43 follows and the diagnosis and initialization of the LSI for the keyboard are executed. Further, if necessary, the diagnosis regarding the audio circuit is also performed. In step S45, an initialization message display by the display output of a predetermined message is executed. In step S46, a diagnosis of a multiple abnormality of the ECC single bit and multibits is executed as an ECC part 2. In step S47, a diagnosis test to simulate the operations of the secondary cache memory unit 44 and secondary cache control unit 46 shown in FIG. 2 provided for the master processor 10-1 is performed. In step S48, a memory diagnosis is executed. If an error occurs at the time of the memory diagnosis in step S49, the processing routine is returned to step S22 in the first master initializing process in FIG. 14 and the diagnosing process is again repeated. When there is no error in step S19, a finishing process of the memory diagnosis is performed in step S50. In step S51, the flag code of the self flag register 60-1 is set to 2 and the slave start is performed. In step S52, an access and a diagnosis of a patrol register are executed and a patrol period is set. The patrol register reads the contents in the memory every predetermined period by the hardware, thereby performing an ECC check. In step S53, a timer diagnosis of a watchdog timer or the like is executed. In step S54, a calculating process of a clock provided for the processor is performed. The processing routine advances to an interruption diagnosing process in FIG. 21.

Figure 21:
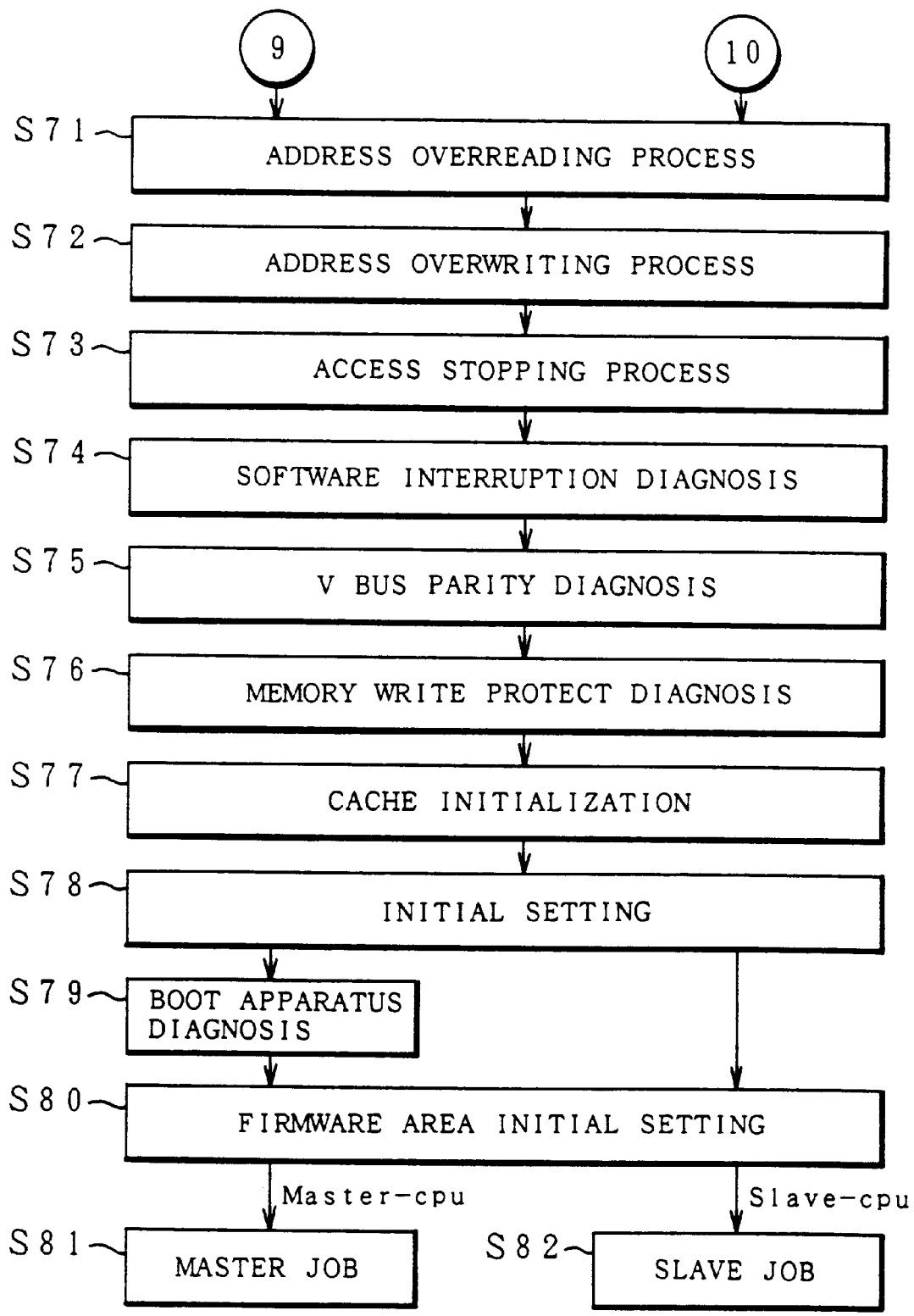
FIG. 21 is a flowchart for interruption diagnosing processes of a master and slaves in FIG. 11.

A flowchart of FIG. 21 shows the interruption diagnosing process in the master processor 10-1 and slave processors 10-2 to 10-4. First in step S71, an abnormal system diagnosing process at the time when the reading operation is performed to an address overarea is executed. In step S72, an abnormal system diagnosing process at the time when the writing operation is performed to the address overarea is executed. In step S73, an access stopping process is performed. In step S74, a software interruption diagnosis of levels 1, 6, 11, 12, and 14 is performed. In step S75, a parity diagnosis of internal buses connecting the CPU 26 in the processor 10-1 shown in FIG. 1 and the secondary cache memory unit 44 and secondary cache control unit 46 is executed. In step S76, a protection test of a memory loading address area and a process of a write access abnormal system are performed.

After completion of the above diagnosing processes, in step S77, all of the caches of the instruction cache memory unit 36, data cache memory unit 38, and further secondary cache memory unit 44 provided for the processor 10-1 are initialized and set into a usable state. In step S78, the running position of the program is returned from the EEPROM 14 to the SRAM 16 and the cache mechanism is turned off. In step S79, the master processor 10-1 executes a diagnosis of boot apparatuses such as SCSI unit, DMA unit, FDC unit, LAN unit, and the like. In step S80, an initial setting of a firmware area is executed with respect to the master processor 10-1 and slave processors 10-2 to 10-4. All of the initializing processes in association with the power-on-start are finished by such an initialization. In step S81, a master job is executed. In step S82, a slave job is executed.

According to the invention as described above, the plurality of processors which were made effective at the time of turn-on of the power source are recognized and the processor having the master authority and the processors having the slave authority among those processors can be dynamically allocated. Even if a special processor is not activated by the power-on, a multiprocessor system can be constructed by a construction of the effective activated processors.

In the initialization diagnosing process which are sequentially performed in accordance with the order of the master processor and slave processors after completion of the master/slave allocation, the initialization diagnosing process of the master processor is monitored by the slave processor. When an abnormality of the master processor is recognized, the master processor is disconnected from the system and the allocating process of the master and slaves is again executed. Thus, a system hang up due to the abnormality of the master processor in the case such that the master processor has fixedly been determined can be certainly prevented.

During the initializing diagnosis of the slave processor, the master processor monitors the states of the slave processors. Due to this, if there is an abnormality in the slave processor, the slave processor is disconnected from the system. Thus, even when an abnormality occurs in either one of the master processor and the slave processors during the initializing diagnosis, a reconstruction such that the system operation can be performed even with the minimum construction can be realized.

Further, when the program code of the shared memory is used in all of the processors and the program is run, by providing a cache mechanism such that the program code that has once been fetched is stored into each processor and is used, the number of accessing times of the shared section from the slave processor in the system operation can be reduced to the necessary minimum value. The use of the system bus is released to the master processor which performs the accessing function of the shared section. The deterioration of the bus performance in the multiprocessor system can be minimized.

Although the above embodiment has been described with respect to the case where four processors were connected to the shared bus as an example, the number of processors can be also properly determined as necessary.

Although the embodiment has been described with respect to the case where the secondary cache was provided as an example, the invention can be also applied to a processor without a secondary cache.

Further, the initialization diagnosing processes of the master processor and slave processors shown in the above embodiment are properly decided as necessary and the invention is not limited by the diagnosis contents shown in the embodiment.

What is claimed is:

1. A control method of a multiprocessor system, comprising:

a resetting step of resetting each of shared sections including a plurality of processors connected through a shared bus and a read only memory unit in which common program information that is operated by said plurality of processors has been stored at the time of system activation;

a processor authority allocating step of judging the processors effectively connected to the system after the resetting in said resetting step, allocating a master authority to one of said plurality of effective processors, setting said one of the effective processors to a master processor, allocating a slave authority to all of the other remaining processors, and setting said remaining processors to slave processors;

an initialization diagnosing step of sequentially executing peculiar initialization diagnosing processes in accordance with the order of said master processor and said slave processors; and a distributing processing step of distributing a job to said plurality of processors and executing the job at the stare when said initialization diagnosing process is normally finished, wherein said processor authority allocating step includes:

a wake-up step of setting a wake-up bit of a wake-up register provided for each of said processors after completion of the resetting of each of said processors, an effective processor setting step of using the processor in which said wake-up bit was set in said wake-up step as a processor that is effective in the system and setting the corresponding bit of the processor effective register provided for said processor, a system connection processor detecting step of detecting a physical connection of the processors to said shared bus and setting a corresponding bit of a processor connection register provided for the shared section which can be referenced by all of said processors, an authority recognizing step of recognizing a self processor ID number from ID numbers which have been stored in a processor number register provided for each of said processors, comparing said recognized ID number with the processor ID numbers of the other processors shown by the effective register obtained in said effective processor setting step, recognizing that the self processor is a master processor when said self processor ID number is minimum or maximum, and recognizing that the self processor is a slave processor when said self processor ID number is other than the minimum or maximum ID number, an initialization diagnosing step of sequentially executing peculiar initialization diagnosing processes in accordance with the order of said master processor and said slave processor, and a distributing processing step of distributing a job to said plurality of processors and executing said job at the stage when said initialization diagnosing step is normally finished, wherein said initialization diagnosing step comprises:

a master monitoring step of monitoring by each of said slave processors whether the initializing diagnosis of said master processor has normally been finished or not; and a degenerating processing step which is constructed in a rule such that in the case where either one of said slave processors detects an abnormality of said master processor in said master monitoring step, said master processor is disconnected from the system and is degenerated, a new master processor and new slave processors are allocated to the other remaining processors as targets by said processor authority allocating step, and processes are again executed after that, and wherein said master monitoring step comprises:

a threshold time setting step of setting a threshold time (Ti) for master monitoring which becomes short as a priority is high in accordance with a priority of the master authority allocation that is determined by a processor number (i) into each slave processor;

a counting step of getting a synchronization when idle states of all of said processors are recognized by referring to a processor arrival register which is provided in said shared section and sets an operating state and the idle state of each processor, and starting a time counting of a master monitoring time (T) based on a start of the initialization diagnosing process to monitor an initializing diagnosis of said master processor in each of said slave processors; and a master abnormality judging step which is constructed in a rule such that the presence or absence of the end of the initializing diagnosis by said master processor is monitored during the time counting in said counting step, in the case where the end of the initializing diagnosis is recognized when the counting time (T) lies within said threshold time (Ti), it is judged that the master processor is normal, the processing routine advances to the initialization diagnosing process of a next said slave processor, and in the case where the end of the initializing diagnosis cannot be recognized even when the counting time (T) reaches the shortest threshold time (Ti), it is judged that said master processor is abnormal, the slave processor in which the shortest threshold time has been set is set to a new master processor, and the processing routine advances to said degenerating process.

2. A method according to claim 1, wherein in said counting step, the value of the timer in which said threshold time (Ti) has been set is subtracted each time a unit time elapses, and in said master abnormality judging step, in the case where the end of the initializing diagnosis is recognized before the timer value is equal to 0, it is judged that the master processor is normal, the processing routine advances to the initialization diagnosing process of the next slave processor, and in the case where the end of the initializing diagnosis cannot be recognized even when said time value reaches 0, it is judged that said master processor is abnormal, the slave processor in which the abnormality of said master processor was judged is set to a new master processor, and the processing routine advances to said degenerating process.

3. A method according to claim 1, wherein in said master abnormality judging step, the presence or absence of the end of the initializing diagnosis is recognized by referring to a flag register provided for the master processor.

4. A method according to claim 1, wherein in said initialization diagnosing step includes:
   a slave monitoring step of monitoring by said master processor whether the initializing diagnosis of said slave processor has normally been finished or not; and
   a degenerating step which is constructed in a rule such that in the case where said master processor detects an abnormality of the slave processor in said slave monitoring step, said slave processor is disconnected from the system and is degenerated.

5. A method according to claim 4, wherein said slave monitoring step includes:
   a threshold time setting step of setting a predetermined threshold time (T0) for slave monitoring into the master processor;
   a counting step of starting a counting of a slave monitoring time (T) in said master processor by the start of the initialization diagnosing process of the slave processor in association with the end of the initializing diagnosis of said master processor; and
   a slave abnormality judging step which is constructed in a rule such that the presence or absence of the end of the initializing diagnosis by said slave processor is monitored during the time counting of said slave monitoring time by said counting step, and in the case where the end of the initializing diagnosis is recognized when said slave monitoring time lies within said threshold time (T0), it is judged that said slave processor is normal, and in the case where the end of the initializing diagnosis cannot be recognized even when said slave monitoring time reaches said threshold time (T0), it is judged that said slave processor is abnormal, and the processing routine advances to said degenerating process for disconnecting said slave processor.

6. A method according to claim 5, wherein in said counting step, the value (T) of the timer in which said threshold time (T0) has been set is subtracted each time a unit time elapses,
   and in said slave abnormality judging step, in the case where the end of the initializing diagnosis is recognized before the timer value (T) is equal to 0, it is judged that said slave processor is normal, and in the case where the end of the initializing diagnosis cannot be recognized even when the timer value (T) reaches 0, it is judged that the slave processor is abnormal, and the processing routine advances to said degenerating process for disconnecting said slave processor.

7. A method according to claim 6, wherein in said slave abnormality judging step, the presence or absence of the end of the initializing diagnosis is recognized with reference to a waiting state arrival register of said shared section to which the corresponding bit is set due to the arrival to the waiting state based on the end of the initializing process of the slave processor.

8. A multiprocessor system comprising:
   a shared bus;
   a plurality of processors connected through said shared bus;
   a shared section including a read only memory unit in which program information that is common to said plurality of processors has been stored;
   a reset processing section for resetting each of said plurality of processors and said shared section at the time of a system activation;
   a wake-up register, provided for each of said processors, for setting a wake-up bit at the time of completion of a resetting of each of said processors;
   a processor effective register, provided for each of said processors, for setting a corresponding bit while setting the processor in which the wake-up bit of said wake-up register has been set to a processor that is effective in the system;
   a processor number register which is provided for each of said processors and in which a self processor number has been stored;
   a processor connection register which is provided for said shared section and detects a physical connection of the processors to said shared bus and can be referred by all of the processors in which the corresponding bit is set;
   an allocation processing section for recognizing the self processor number from numbers which have previously been stored in a processor number register provided for each of said processors after the end of resetting by said reset processing section, comparing said self processor number with the processor number of the other processors shown by the effective register obtained by said effective processor setting section, recognizing that the self processor is a master processor when said self processor number is minimum or maximum, and recognizing that the self processor is a slave processor when said self processor number is other than minimum or maximum thereby allocating a master authority to one of said plurality of effective processors, for using said one of the effective processors as a master processor, for allocating a slave authority to all of the remaining other processors, and for using said remaining processors as slave processors;
   an initialization diagnosis processing section for sequentially executing peculiar initialization diagnosing process in accordance with the order of said master processor and said slave processor; and
   a job executing section for distributing a job to said plurality of processors and for executing the job at the stage when the process of said initialization diagnosis processing section is normally finished,
   wherein said initialization diagnosing section has:
      a master monitoring section for monitoring by each of said slave processors whether the initializing diagnosis of said master processor has normally been finished or not; and
      a master degeneration processing section which is constructed in a rule such that in the case where either one of said slave processors detects an abnormality of the master processor in said master monitoring section, said master processor is disconnected from the system and is degenerated, a new master processor and new slave processors are allocated to the other remaining processors as targets by said allocation processing section, and the processes are again executed, and
   wherein said master monitoring section has:
      a threshold time setting section for setting a threshold time (Ti) for self master monitoring which is short as a priority is high in accordance with a priority of the master authority allocation that is determined by a processor number (i) into each of said slave processors;
      a processor arrival register, provided for said shared section, for setting an operating state and an idle state of each of said processors;
      a counting section for getting a synchronization when the idle states of all of the processors are recognized by referring to said processor arrival register and starting a time counting of a master monitoring time (T) to monitor an initializing diagnosis of said master processor in each of said slave processors; and a master abnormality judging section which is constructed in a rule such that the presence or absence of the end of the initializing diagnosis by said master processor during the time counting of said counting section, and in the case where the end of the initializing diagnosis is recognized when said counting time (T) lies within said threshold time (Ti), it is judged that said master processor is normal, the processing routine advances to the initialization diagnosing process of a next said slave processor, and in the case where the end of the initializing diagnosis cannot be recognized even when the counting time (T) reaches the shortest threshold time (Ti) which was set into said slave processor, it is judged that said master processor is abnormal, and the processing routine advances to said degenerating process while setting the slave processor in which said shortest threshold time has been set to a new master processor.

9. A system according to claim 8, wherein said counting section subtracts the value of the timer in which said threshold time (Ti) was set every elapse of a unit time, and said master abnormality judging section is constructed in a rule such that in the case where the end of the initializing diagnosis is recognized before said timer value is equal to 0, it is judged that the master processor is normal, the processing routine advances to the initialization diagnosing process of the next slave processor, and in the case where the end of the initializing diagnosis cannot be recognized even when the timer value reaches 0, it is judged that said master processor is abnormal, and the processing routine advances to said degenerating process while setting the slave processor in which the abnormality of said master processor was judged to a new master processor.

10. A system according to claim 8, wherein said master abnormality judging section recognizes the presence or absence of the end of the initializing diagnosis with reference to a flag register provided for the master processor.

11. A system according to claim 8, wherein said initialization diagnosing section has:

a slave monitoring section for monitoring by said master processor whether the initializing diagnosis of said slave processor has normally been finished or not; and a slave degeneration processing section which is constructed in a rule such that in the case where an abnormality of the slave processor is detected by said slave monitoring section, said slave processor is disconnected from the system and is degenerated.

12. A system according to claim 11, wherein said slave monitoring section has:

a threshold time setting section for setting a predetermined threshold time (T0) of the slave monitoring into the master processor;

a counting section for starting the counting of a slave monitoring time (T) in said master processor by the start of the initialization diagnosing process of the slave processor in association with the end of the initializing diagnosis of said master processor; and a slave abnormality judging section which is constructed in a rule such that the presence or absence of the end of the initializing diagnosis by said slave processor is monitored during the time counting of the slave monitoring time by said counting section, and in the case where the end of the initializing diagnosis is recognized when said slave monitoring time lies within said threshold time (T0), it is judged that said slave processor is normal, and in the case where the end of the initializing diagnosis cannot be recognized even when said slave monitoring time reaches the threshold time (T0), it is judged that said slave processor is abnormal, and the processing routine advances to said degenerating process for disconnecting said slave processor.

13. A system according to claim 12, wherein said counting section subtracts the value (T) of the timer in which said threshold time (T0) was set every elapse of a unit time, and said slave abnormality judging section is constructed in a rule such that in the case where the end of the initializing diagnosis is recognized before said timer value (T) is equal to 0, it is judged that said slave processor is normal, and in the case where the end of the initializing diagnosis cannot be recognized even when the timer value (T) reaches 0, it is judged that said slave processor is abnormal, and the processing routine advances to said degenerating process for disconnecting said slave processor.

14. A system according to claim 13, wherein said slave abnormality judging section recognizes the presence or absence of the initializing diagnosis with reference to a waiting state arrival register of said shared section to which a corresponding bit is set by the arrival to a waiting state based on the end of the initializing process of the slave processor.

* * * * *